United States Patent
Chen et al.

(10) Patent No.: US 12,388,267 B2
(45) Date of Patent: Aug. 12, 2025

(54) DIRECT CURRENT COMBINER BOX, PHOTOVOLTAIC POWER GENERATION SYSTEM, AND FAULT DETECTION METHOD

(71) Applicant: HUAWEI DIGITAL POWER TECHNOLOGIES CO., LTD., Shenzhen (CN)

(72) Inventors: Dong Chen, Shanghai (CN); Yongbing Gao, Shanghai (CN); Yunfeng Liu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 76 days.

(21) Appl. No.: 18/489,255

(22) Filed: Oct. 18, 2023

(65) Prior Publication Data
US 2024/0047973 A1 Feb. 8, 2024

Related U.S. Application Data

(63) Continuation of application No. PCT/CN2021/088216, filed on Apr. 19, 2021.

(51) Int. Cl.
*H02J 3/38* (2006.01)
*H02J 3/00* (2006.01)
(Continued)

(52) U.S. Cl.
CPC ............ *H02J 3/381* (2013.01); *H02J 3/0012* (2020.01); *H02M 1/0009* (2021.05); *H02M 1/32* (2013.01);
(Continued)

(58) Field of Classification Search
CPC ....................................... H02J 3/381
(Continued)

(56) References Cited

U.S. PATENT DOCUMENTS 7,079,406 B2 7/2006 Kurokami et al.
7,468,871 B2 12/2008 Jackson et al.
(Continued)

FOREIGN PATENT DOCUMENTS

AU 2003279470 B2 4/2008
AU 2008201173 B2 7/2010
(Continued)

OTHER PUBLICATIONS

Extended European Search Report in European Appln No. 21937260.4, dated May 31, 2024, 7 pages.
(Continued)

*Primary Examiner* — Joseph Chang
(74) *Attorney, Agent, or Firm* — Fish & Richardson P.C.

(57) ABSTRACT

This application describes examples of a direct current combiner box, a photovoltaic power generation system, and a fault detection method. In one example, the direct current combiner box includes a fault detection unit, a protection circuit, and a boost circuit. The fault detection unit detects an operating parameter of the direct current combiner box. The protection circuit sends a protection signal to the boost circuit when the operating parameter meets a specified condition. The protection signal is used to enable the boost circuit to adjust a first voltage of a photovoltaic array at an input end of the direct current combiner box to a second voltage. After receiving the protection signal, the boost circuit adjusts the first voltage of the photovoltaic array at the input end of the direct current combiner box to the second voltage.

19 Claims, 12 Drawing Sheets

(51) Int. Cl.
*H02M 1/00* (2006.01)
*H02M 1/32* (2007.01)
*H02S 50/10* (2014.01)
*H02G 3/08* (2006.01)

(52) U.S. Cl.
CPC .............. *H02S 50/10* (2014.12); *H02G 3/08* (2013.01); *H02J 2300/26* (2020.01)

(58) Field of Classification Search
USPC .......................................................... 307/43
See application file for complete search history.

(56) References Cited

U.S. PATENT DOCUMENTS

| | | | |
|---|---|---|---|
| 9,397,494 B2 | 7/2016 | Hofheinz et al. | |
| 2009/0160259 A1* | 6/2009 | Naiknaware | H02M 7/4807 307/82 |
| 2021/0249862 A1* | 8/2021 | Awal | H02J 3/38 |
| 2022/0140781 A1 | 5/2022 | Zhang et al. | |
| 2024/0014684 A1 | 1/2024 | Chen et al. | |

FOREIGN PATENT DOCUMENTS

| | | | |
|---|---|---|---|
| CN | 1375902 | A | 10/2002 |
| CN | 101282035 | B | 7/2012 |
| CN | 103001175 | B | 2/2016 |
| CN | 110888085 | A | 3/2020 |
| CN | 112260533 | A | 1/2021 |
| EP | 1561267 | B1 | 2/2011 |
| EP | 1936772 | B1 | 10/2013 |
| EP | 2571128 | B1 | 10/2015 |

OTHER PUBLICATIONS

International Search Report and Written Opinion in International Appln. No. PCT/CN2021/088216, mailed on Jan. 19, 2022, 15 pages (with English translation).

* cited by examiner

Boost circuit 303

DIRECT CURRENT COMBINER BOX, PHOTOVOLTAIC POWER GENERATION SYSTEM, AND FAULT DETECTION METHOD

CROSS-REFERENCE TO RELATED APPLICATIONS

This application is a continuation of International Application No. PCT/CN2021/088216, filed on Apr. 19, 2021, the disclosure of which is hereby incorporated by reference in its entirety.

TECHNICAL FIELD

This application relates to the field of photovoltaic power generation, and in particular, to a direct current combiner box, a photovoltaic power generation system, and a fault detection method.

BACKGROUND

As market requirements and technology develop, the use of photovoltaic power generation systems is increasing. A photovoltaic power generation system is a new type of power generation system that utilizes a photovoltaic effect of a photovoltaic module to directly convert solar radiation into electrical energy.

The photovoltaic power generation system includes a photovoltaic array, a direct current combiner box, and an inverter. The photovoltaic array is a series-parallel combination of photovoltaic modules. The direct current combiner box usually includes a boost chopper (boost chopper) circuit. An input side of the direct current combiner box is connected to a photovoltaic array, and an output side of the direct current combiner box is connected to an inverter. The boost chopper circuit is configured to convert a wide-range direct current voltage output by the photovoltaic array into a stable direct current voltage, so that when the inverter converts a direct current voltage into an alternating current voltage, a level requirement for the direct current voltage is met. In addition, the boost chopper circuit may further implement maximum power point tracking (MPPT) control on the photovoltaic array. This improves an overall power generation amount of the photovoltaic array and reduces an overall cost of the photovoltaic power generation system.

However, if any one or more of a cable connecting the photovoltaic array to the input side of the direct current combiner box, a cable connecting the inverter to the output side of the direct current combiner box, and the direct current combiner box are faulty, a security threat is posed to installation personnel or maintenance personnel on site. In view of this, how to ensure personal safety of installation personnel or maintenance personnel on the site of a photovoltaic power generation system is currently an urgent problem to be resolved.

SUMMARY

This application provides a direct current combiner box, a photovoltaic power generation system, and a fault detection method, to reduce a voltage transmitted by a photovoltaic array to an input end of the direct current combiner box to a safety voltage, when the direct current combiner box or a cable connecting to the direct current combiner box is faulty, so as to ensure safety of personnel on site.

According to a first aspect, this application provides a direct current combiner box, used in a photovoltaic power generation system. The direct current combiner box includes a fault detection unit, a protection circuit, and a boost circuit. An input end of the direct current combiner box is coupled to a photovoltaic array in the photovoltaic power generation system. The fault detection unit is configured to detect an operating parameter of the direct current combiner box. The operating parameter includes at least one of a residual current at an output end of the direct current combiner box, first insulation impedance to ground of the direct current combiner box, and an input voltage transmitted by the photovoltaic array to the input end of the direct current combiner box. The protection circuit is configured to send a protection signal to the boost circuit when the operating parameter meets a specified condition. The protection signal is used to enable the boost circuit to adjust a first voltage of the photovoltaic array at the input end of the direct current combiner box to a second voltage. The second voltage is a zero voltage or a non-zero voltage not higher than a safety voltage. The specified condition includes at least one of the following: the residual current is greater than a first threshold, the first insulation impedance to ground is less than a second threshold, and the input voltage is greater than a third threshold. The boost circuit is configured to: after receiving the protection signal, adjust the first voltage of the photovoltaic array at the input end of the direct current combiner box to the second voltage.

Based on the foregoing direct current combiner box, when a cable between the direct current combiner box and the photovoltaic array is faulty, or a fault occurs in the direct current combiner box, or a cable on an output side of the direct current combiner box is faulty, and a person on site touches the cable or the direct current combiner box, the first voltage of the photovoltaic array at the input end of the direct current combiner box may be adjusted to the second voltage. The second voltage is a zero voltage or a non-zero voltage not higher than the safety voltage. It is clear that with the use of this solution, a voltage transmitted by the photovoltaic array to the input end of the direct current combiner box can be reduced to the safety voltage, so that safety of personnel can be protected.

The operating parameter provided in this application includes a residual current at the output end of the direct current combiner box. The fault detection unit includes a residual current detection circuit, configured to detect the residual current at the output end of the direct current combiner box. The residual current detection circuit detects the residual current at the output end of the direct current combiner box, and sends the residual current to the protection circuit, so that the protection circuit determines, by determining a relationship between the residual current and the first threshold, whether to send the protection signal to the boost circuit. When the residual current is greater than the first threshold, the protection signal is sent to the boost circuit, so that the boost circuit adjusts the first voltage of the photovoltaic array at the input end of the direct current combiner box to the second voltage, thereby protecting safety of the personnel.

The operating parameter provided in this application further includes first insulation impedance to ground of the direct current combiner box. The fault detection unit includes an insulation impedance detection circuit, configured to detect the first insulation impedance to ground of the direct current combiner box. The insulation impedance detection circuit determines the first insulation impedance to ground of the direct current combiner box, and sends the first insulation impedance to ground to the protection circuit, so that the protection circuit determines, by determining a relationship between the first insulation impedance to ground and the second threshold, whether to send the protection signal to the boost circuit. When the first insulation impedance to ground is less than the first threshold, the protection signal is sent to the boost circuit, so that the boost circuit adjusts the first voltage of the photovoltaic array at the input end of the direct current combiner box to the second voltage, thereby protecting safety of the personnel.

The operating parameter provided in this application includes the input voltage transmitted by the photovoltaic array to the input end of the direct current combiner box. The fault detection unit includes an input voltage detection circuit, configured to detect the input voltage transmitted by the photovoltaic array to the input end of the direct current combiner box. The input voltage detection circuit obtains the input voltage of the direct current combiner box, and sends the input voltage to the protection circuit, so that the protection circuit determines, by determining a relationship between the input voltage and the third threshold, whether to send the protection signal to the boost circuit. When the input voltage is greater than the third threshold, the protection signal is sent to the boost circuit, so that the boost circuit adjusts the first voltage of the photovoltaic array at the input end of the direct current combiner box to the second voltage, thereby protecting safety of the personnel.

The boost circuit in the direct current combiner box provided in this application includes any one of a two-level boost circuit or a three-level boost circuit. The two-level boost circuit or the three-level boost circuit includes at least one switching transistor. The boost circuit is specifically configured to control, in a manner indicated by the protection signal, the at least one switching transistor to be turned on and turned off, so as to adjust the first voltage of the photovoltaic array at the input end of the direct current combiner box to the second voltage. In addition, the boost circuit in this embodiment of this application may be various types of boost circuits. The photovoltaic array is short-circuited through a switch device, so that the voltage of the photovoltaic array is reduced to the safety voltage, thereby eliminating a threat posed by the residual current.

The manner indicated by the protection signal provided in this application includes at least one of the following: straight-through, a pulse width modulation method, a phase modulation method, and a frequency modulation method. In the foregoing manner, the first voltage of the photovoltaic array may be adjusted to the second voltage. For example, when the protection signal is a straight-through signal, the straight-through signal is used to control the switching transistor in the boost circuit to keep turned on, so as to short-circuit the photovoltaic array through an inductor and the switching transistor, and finally reduce the voltage of the photovoltaic array to the safety voltage or to a voltage close to 0 V. This eliminates a threat posed by the residual current caused by the voltage of the photovoltaic array and protects safety of the personnel.

When the photovoltaic array transmits the voltage to the direct current combiner box, the boost circuit in the direct current combiner box may be at a floating potential. As a result, the voltage transmitted by the photovoltaic array to the direct current combiner box may be low, but a voltage to ground of the direct current combiner box is still quite high. An excessively high voltage to ground also poses a threat to safety of personnel on site. To control the voltage to ground of the direct current combiner box, the input end of the direct current combiner box provided by this application includes a positive input end and a negative input end. The direct current combiner box further includes a first voltage to ground control circuit, and the first voltage to ground control circuit is coupled to the negative input end of the direct current combiner box. The protection circuit is further configured to: when the operating parameter meets the specified condition, send a first voltage control signal to the first voltage to ground control circuit. The first voltage to ground control circuit is configured to adjust a voltage to ground at the negative input end of the direct current combiner box to a third voltage based on the first voltage control signal, where the third voltage is not higher than the safety voltage. After the voltage to ground at the negative input end of the direct current combiner box is adjusted to the third voltage, because the voltage to ground at the negative input end of the direct current combiner box is already lower than the safety voltage, a voltage to ground at a negative end of the photovoltaic array connected to the negative input end of the direct current combiner box is also lower than the safety voltage. In addition, because the voltage of the photovoltaic array is already reduced to a relatively low voltage, a voltage to ground of the photovoltaic array may be controlled to be also lower than the safety voltage. Through the first voltage to ground control circuit, when a fault occurs, both a positive end and the negative end of the photovoltaic array can be lower than the safety voltage, thereby further protecting safety of the personnel.

To more accurately determine insulation impedance to ground of the direct current combiner box and implement a function of automatically restoring operation of a power device after the fault is cleared, the protection circuit in the direct current combiner box provided n this application is further configured to send a second voltage control signal to the first voltage to ground control circuit after first duration has ended since the first voltage control signal is sent to the first voltage to ground control circuit. The first voltage to ground control circuit is further configured to adjust the voltage to ground at the negative input end of the direct current combiner box to a fourth voltage based on the second voltage control signal, where the fourth voltage is not higher than the safety voltage. The protection circuit is further configured to determine: second insulation impedance to ground of the direct current combiner box based on the residual current at the output end of the direct current combiner box and the fourth voltage; and when the second insulation impedance to ground is greater than a fourth threshold, stop sending the protection signal to the boost circuit. Through the foregoing manner, after the insulation impedance to ground of the direct current combiner box can be more accurately determined, and the fault in the direct current combiner box is cleared, the direct current combiner box can automatically restore operation without manual intervention, which improves automation of the device and reduces maintenance costs.

The first voltage to ground control circuit in the direct current combiner box provided in this application includes N resistors and N controllable switches. The N resistors are in a one-to-one correspondence with the N controllable switches. Each resistor is coupled to a corresponding controllable switch, and each resistor and the corresponding controllable switch form a controllable resistor. A first end of each controllable resistor is coupled to the negative input end of the direct current combiner box, and a second end of each controllable resistor is coupled to ground. The first voltage to ground control circuit is specifically configured to: close a target controllable switch in the N controllable switches based on the first voltage control signal, to adjust the voltage to ground at the negative input end of the direct current combiner box to the third voltage. The voltage to ground at a negative input end of the boost circuit can be adjusted by controlling turn-on and turn-off of the controllable switches on the controllable resistors formed by the N resistors and the N controllable switches, so as to protect safety of the personnel.

The first voltage to ground control circuit in the direct current combiner box provided in this application may further include a controllable direct-current power supply. One end of the controllable direct-current power supply is coupled to the negative input end of the boost circuit, and the other end is coupled to ground. The controllable direct-current power supply is controlled to directly adjust the voltage to ground at the negative input end of the direct current combiner box, so as to protect safety of the personnel.

A voltage to ground of an alternating current phase line is adjusted through the controllable direct-current power supply, so that the voltage to ground at the negative input end of the direct current combiner box can also be indirectly adjusted. The input end of the direct current combiner box provided in this application includes a positive input end and a negative input end. The photovoltaic power generation system further includes an inverter. An output end of the inverter includes at least one alternating current phase line. The output end of the direct current combiner box is coupled to the inverter. The direct current combiner box further includes a second voltage to ground control circuit, where the second voltage to ground control circuit is coupled to the at least one alternating current phase line of the inverter. The protection circuit is further configured to: when the operating parameter meets the specified condition, send a third voltage control signal to the second voltage to ground control circuit. The second voltage to ground control circuit is configured to adjust a voltage to ground of the at least one alternating current phase line to a fifth voltage based on the third voltage control signal, so that a voltage to ground at the negative input end of the direct current combiner box is adjusted to a sixth voltage. The sixth voltage is not higher than the safety voltage. In this way, the voltage to ground at the negative input end of the direct current combiner box can be adjusted, so as to protect safety of the personnel.

Because a switch device inside the boost circuit may also be damaged, in this case, if the protection signal is sent to the boost circuit, it is difficult to control the voltage of a photovoltaic array at the input end of the direct current combiner box. When the direct current combiner box or the cable connecting to the direct current combiner box is faulty, it is difficult to protect safety of personnel on site. In view of this, the direct current combiner box provided in this application further includes a breaking circuit. The breaking circuit is coupled between an input end of the boost circuit and the input end of the direct current combiner box. The protection circuit is further configured to: after third duration has ended since the protection signal is sent to the boost circuit, determine whether the operating parameter meets the specified condition; and send a breaking signal to the breaking circuit when determining that the operating parameter meets the specified condition. The breaking signal is used to enable the breaking circuit to break a connection between the input end of the boost circuit and the input end of the direct current combiner box. The breaking circuit is configured to break, based on the breaking signal, the connection between the input end of the boost circuit and the input end of the direct current combiner box. A breaking switch in the breaking circuit can turn off a switch based on an effective breaking signal, to disconnect input of the direct current combiner box from the photovoltaic array. This reliably ensures safety of the personnel.

In some other possible implementations, the direct current combiner box provided in this application further includes a breaking circuit. The breaking circuit is coupled between an input end of the boost circuit and the input end of the direct current combiner box. The protection circuit is further configured to: after fourth duration has ended since the first voltage control signal is sent to the first voltage to ground control circuit, determine whether the operating parameter meets the specified condition; and send a breaking signal to the breaking circuit when determining that the operating parameter meets the specified condition. The breaking signal is used to enable the breaking circuit to break a connection between the input end of the boost circuit and the input end of the direct current combiner box. The breaking circuit is configured to break, based on the breaking signal, the connection between the input end of the boost circuit and the input end of the direct current combiner box. The voltage to ground at the negative input end of the direct current combiner box is adjusted to the third voltage through the first voltage to ground control circuit. In addition, when it is determined, after the fourth duration, that the operating parameter still meets the specified condition, as a backup means, this implementation prevents a problem that the boost circuit is short-circuited or in poor contact or the residual current is still large after the photovoltaic array is short-circuited, and the protection circuit cannot protect safety of the personnel on site through the protection signal.

In some possible implementations, the protection circuit in the direct current combiner box provided in this application is further configured to: determine whether the operating parameter of the direct current combiner box exceeds a preset threshold or a preset value range, and send an alarm signal when the operating parameter exceeds the preset threshold or the preset value range, so that the personnel on site can protect and repair the direct current combiner box in real time. In addition, when the direct current combiner box is faulty, another power device related to the direct current combiner box is protected or disabled, thereby further protecting safety of the personnel.

In addition, in an actual application scenario, there is a case in which outputs of a plurality of direct current combiner boxes are connected in parallel, or outputs of the direct current combiner boxes are connected to another apparatus, where input ends of the direct current combiner boxes are connected to respective independent photovoltaic arrays. In some possible implementations, the protection circuit is further configured to: determine a current direction of the residual current, and send the protection signal to the boost circuit only when it is determined that the operating parameter meets the specified condition and the current direction is a preset direction. In this way, when another direct current combiner box or another apparatus on the output side of the direct current combiner box is faulty, the another apparatus itself performs protection, and the direct current combiner box still operates normally. This increases a proportion of normally operating apparatuses in the system, further improves a power generation amount, and prevents false protection.

According to a second aspect, this application provides a direct current combiner box, used in a photovoltaic power generation system. The photovoltaic power generation system includes M photovoltaic arrays. The direct current combiner box includes a fault detection unit, M boost circuits, and a protection circuit. Input ends of direct current combiner box are coupled to the M photovoltaic arrays in the photovoltaic power generation system. The M photovoltaic arrays are in a one-to-one correspondence with the M boost circuits, and each photovoltaic array is coupled to a corresponding boost circuit. M is a positive integer. The fault detection unit is configured to: detect an operating parameter of the direct current combiner box, and send the operating parameter to the protection circuit. The operating parameter includes at least one of a residual current at an output end of the direct current combiner box, first insulation impedance to ground of the direct current combiner box, and an input voltage transmitted by the photovoltaic array to the input end of the direct current combiner box. The protection circuit is configured to: receive the operating parameter; and when determining that the operating parameter meets a specified condition, send a first protection signal to a first boost circuit in the M boost circuits, and send a second protection signal to a second boost circuit in the M boost circuits. The first protection signal is used to enable the first boost circuit to adjust a first voltage of a photovoltaic array at the input end of the direct current combiner box to a second voltage. The second protection signal is used to enable the second boost circuit to adjust a first voltage of a photovoltaic array at the input end of the direct current combiner box to a ninth voltage. The ninth voltage is a zero voltage or a non-zero voltage not higher than a safety voltage, the ninth voltage is lower than the second voltage, and the second voltage is not higher than the safety voltage. The specified condition includes at least one of the following: the residual current is greater than a first threshold, the first insulation impedance to ground is less than a second threshold, and the input voltage is greater than a third threshold. The first boost circuit is configured to: after receiving the first protection signal, adjust the first voltage of the photovoltaic array at the input end of the direct current combiner box to the second voltage. The second boost circuit is configured to: after receiving the second protection signal, adjust the first voltage of the photovoltaic array at the input end of the direct current combiner box to the ninth voltage. For technical effects of the corresponding solution in the second aspect, refer to technical effects that can be obtained by the corresponding solution in the first aspect. Details are not described herein again.

According to a third aspect, this application provides a photovoltaic power generation system. The photovoltaic power generation system includes a photovoltaic array and a direct current combiner box. The direct current combiner box includes a fault detection unit, a protection circuit, and a boost circuit. An input end of the direct current combiner box is coupled to the photovoltaic array in the photovoltaic power generation system. The fault detection unit is configured to: detect an operating parameter of the direct current combiner box, and send the operating parameter to the protection circuit. The operating parameter includes at least one of a residual current at an output end of the direct current combiner box, first insulation impedance to ground of the direct current combiner box, and an input voltage transmitted by the photovoltaic array to the input end of the direct current combiner box. The protection circuit is configured to: receive the operating parameter, and send a protection signal to the boost circuit when determining that the operating parameter meets a specified condition. The protection signal is used to enable the boost circuit to adjust a first voltage of the photovoltaic array at the input end of the direct current combiner box to a second voltage. The second voltage is a zero voltage or a non-zero voltage not higher than a safety voltage. The specified condition includes at least one of the following: the residual current is greater than a first threshold, the first insulation impedance to ground is less than a second threshold, and the input voltage is greater than a third threshold. The boost circuit is configured to: after receiving the protection signal, adjust the first voltage of the photovoltaic array at the input end of the direct current combiner box to the second voltage. For technical effects of the corresponding solution in the third aspect, refer to technical effects that can be obtained by the corresponding solution in the first aspect. Details are not described herein again.

According to a fourth aspect, this application provides a photovoltaic power generation system. The photovoltaic power generation system includes M photovoltaic arrays. The direct current combiner box includes a fault detection unit, M boost circuits, and a protection circuit. Input ends of direct current combiner box are coupled to the M photovoltaic arrays in the photovoltaic power generation system. The M photovoltaic arrays are in a one-to-one correspondence with the M boost circuits, and each photovoltaic array is coupled to a corresponding boost circuit. M is a positive integer.

The fault detection unit is configured to: detect an operating parameter of the direct current combiner box, and send the operating parameter to the protection circuit. The operating parameter includes at least one of a residual current at an output end of the direct current combiner box, first insulation impedance to ground of the direct current combiner box, and an input voltage transmitted by the photovoltaic array to the input end of the direct current combiner box. The protection circuit is configured to: receive the operating parameter; and when determining that the operating parameter meets a specified condition, send a first protection signal to a first boost circuit in the M boost circuits, and send a second protection signal to a second boost circuit in the M boost circuits. The first protection signal is used to enable the first boost circuit to adjust a first voltage of a photovoltaic array at the input end of the direct current combiner box to a second voltage. The second protection signal is used to enable the second boost circuit to adjust a first voltage of a photovoltaic array at the input end of the direct current combiner box to a ninth voltage. The ninth voltage is a zero voltage or a non-zero voltage not higher than a safety voltage, the ninth voltage is lower than the second voltage, and the second voltage is not higher than the safety voltage. The specified condition includes at least one of the following: the residual current is greater than a first threshold, the first insulation impedance to ground is less than a second threshold, and the input voltage is greater than a third threshold. The first boost circuit is configured to: after receiving the first protection signal, adjust the first voltage of the photovoltaic array at the input end of the direct current combiner box to the second voltage. The second boost circuit is configured to: after receiving the second protection signal, adjust the first voltage of the photovoltaic array at the input end of the direct current combiner box to the ninth voltage. For technical effects of the corresponding solution in the fourth aspect, refer to technical effects that can be obtained by the corresponding solution in the second aspect. Details are not described herein again.

According to a fifth aspect, this application provides a fault detection method, applied to a photovoltaic power generation system. The system includes a photovoltaic array, a direct current combiner box, a controller, and an inverter apparatus. An input end of the direct current combiner box is coupled to the photovoltaic array in the photovoltaic power generation system, and an output end of the direct current combiner box is coupled to the inverter apparatus. The method includes: Adjusting, by the controller when an operating parameter meets a specified condition, at the input end of the direct current combiner box to a second voltage. The second voltage is a zero voltage or a non-zero voltage not higher than a safety voltage. The operating parameter includes at least one of a residual current at an output end of the direct current combiner box, first insulation impedance to ground of the direct current combiner box, and an input voltage transmitted by the photovoltaic array to the input end of the direct current combiner box. The specified condition includes at least one of the following: the residual current is greater than a first threshold, the first insulation impedance to ground is less than a second threshold, and the input voltage is greater than a third threshold. For technical effects of the corresponding solution in the fifth aspect, refer to technical effects that can be obtained by the corresponding solution in the first aspect. Details are not described herein again.

According to a sixth aspect, this application provides a fault detection method, applied to a photovoltaic power generation system. The system includes M photovoltaic arrays, a direct current combiner box, a controller, and an inverter apparatus. Input ends of the direct current combiner box are coupled to the M photovoltaic arrays in the photovoltaic power generation system, and output ends of the direct current combiner box are coupled to the inverter apparatus. The direct current combiner box includes M boost circuits. The M photovoltaic arrays are in a one-to-one correspondence with the M boost circuits, and each photovoltaic array is coupled to a corresponding boost circuit. M is a positive integer. The method includes: The controller is configured to: when an operating parameter meets a specified condition, adjust a first voltage of a photovoltaic array that is corresponding to a first boost circuit and that is at the input end of the direct current combiner box to a second voltage, and adjust a first voltage of a photovoltaic array that is corresponding to a second boost circuit and that is at the input end of the direct current combiner box to a ninth voltage. The ninth voltage is a zero voltage or a non-zero voltage not higher than a safety voltage, the ninth voltage is lower than the second voltage, and the second voltage is not higher than the safety voltage. The operating parameter includes at least one of a residual current at an output end of the direct current combiner box, first insulation impedance to ground of the direct current combiner box, and an input voltage transmitted by the photovoltaic array to the input end of the direct current combiner box. The specified condition includes at least one of the following: the residual current is greater than a first threshold, the first insulation impedance to ground is less than a second threshold, and the input voltage is greater than a third threshold. For technical effects of the corresponding solution in the sixth aspect, refer to technical effects that can be obtained by the corresponding solution in the second aspect. Details are not described herein again.

These aspects or other aspects of this application are clearer and more comprehensible in descriptions of the following embodiments.

DESCRIPTION OF EMBODIMENTS

Figure 1:
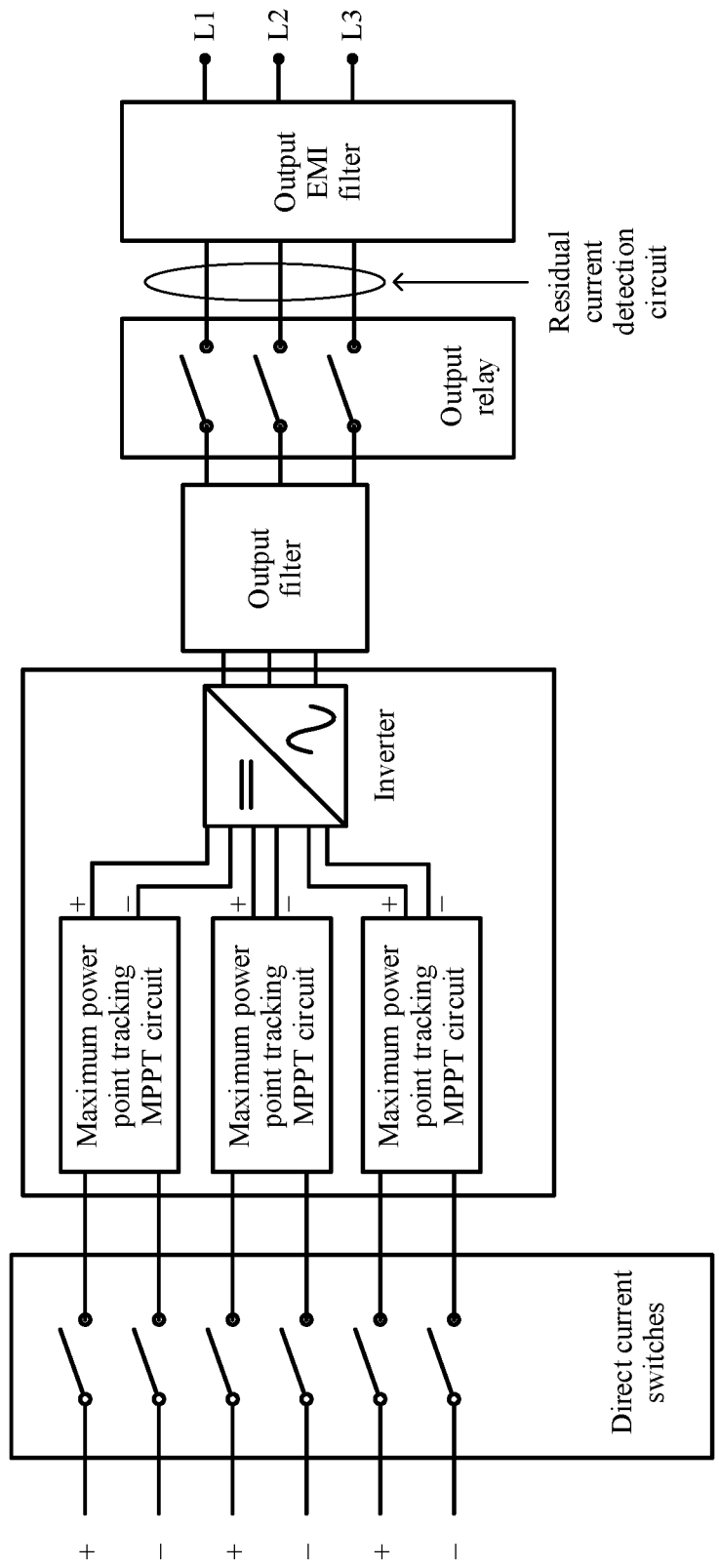
FIG. 1 is a schematic diagram of a scenario of a photovoltaic power generation system.

The following describes some terms in embodiments of this application to help a person skilled in the art have a better understanding.

(1) A direct current combiner box can be connected to at least one photovoltaic array, and is configured to combine currents output by the at least one photovoltaic array, to transmit the currents to a direct current power distribution cabinet, an inverter, an alternating current power distribution cabinet, or another power device, and finally output the currents to an alternating current power grid. This constitutes a complete photovoltaic power generation system. In addition, power supply can be stopped during maintenance and check of the photovoltaic power generation system, and a range not supplied with power is reduced when the photovoltaic power generation system is faulty. The photovoltaic array includes a specific quantity of photovoltaic modules that are connected in series and parallel.

(2) A residual current device (residual current device, RCD) quickly breaks cable connection when leakage occurs on a power device, to protect a user from harm caused by the leakage or an electric shock. Abnormal current and abnormal voltage signals are displayed when leakage occurs on the power device. The residual current device implements leakage protection by detecting the abnormal current signal or abnormal voltage signal.

It should be noted that in description of this application, "at least one" means one or more, and "a plurality of" means two or more. In view of this, "plurality of" may also be understood as "at least two" in embodiments of this application. The term "and/or" describes an association relationship for describing associated objects and represents that three relationships may exist. For example, A and/or B may indicate the following three cases: Only A exists, both A and B exist, and only B exists. In addition, the character "/", unless otherwise specified, generally indicates an "or" relationship between the associated objects. In addition, it should be understood that terms such as "first" and "second" in the descriptions of this application are merely used for distinguishing and description, but should not be understood as indicating or implying relative importance, or should not be understood as indicating or implying a sequence.

It should be further noted that, in the descriptions of this application, "safety voltage" may be a voltage that does not pose a threat to a human body. For example, it is specified that a safety voltage for instant contact of the human body is a voltage not higher than 36 V, and a safety voltage for continuous contact of the human body is a voltage of 24 V. The safety voltage varies in different working scenarios. It is stipulated in the Chinese national standard "Safety Voltage" (GB3805-83) that in China, rated values of safety voltages are 65 V, 42 V, 36 V, 24 V, 12 V, and 6 V. The safety voltage may be selected based on a working site, a condition of an operator, a usage mode, a power supply mode, a line condition, and other factors. For example, a safety voltage in a building without a high electric shock risk is 65 V, a safety voltage in a building with a high electric shock risk is 24 V, and a safety voltage in a building with a particular electric shock risk is 12 V. In addition, a "safety voltage" in the descriptions of this application may be a safety voltage existing when various electronic devices and power devices run. A specific value of the safety voltage is also related to a withstand voltage and a use scenario of the electronic devices and power devices. This is not limited herein. To make the objectives, technical solutions, and advantages of this application clearer, the following further describes this application in detail with reference to the accompanying drawings.

As market requirements and technology develop, the use of photovoltaic power generation systems for power supply is becoming increasingly popular. Therefore, how to ensure the personal safety of installation personnel or maintenance personnel on the site of a photovoltaic power generation system is currently an urgent problem to be resolved. FIG. 1 is a schematic diagram of a structure of a photovoltaic power generation system. As shown in FIG. 1, an MPPT circuit and an inverter in the photovoltaic power generation system are located in a same device. A residual current detection circuit is disposed on an output side of the inverter to detect a residual current, so as to protect safety of personnel on site.

Figure 2:
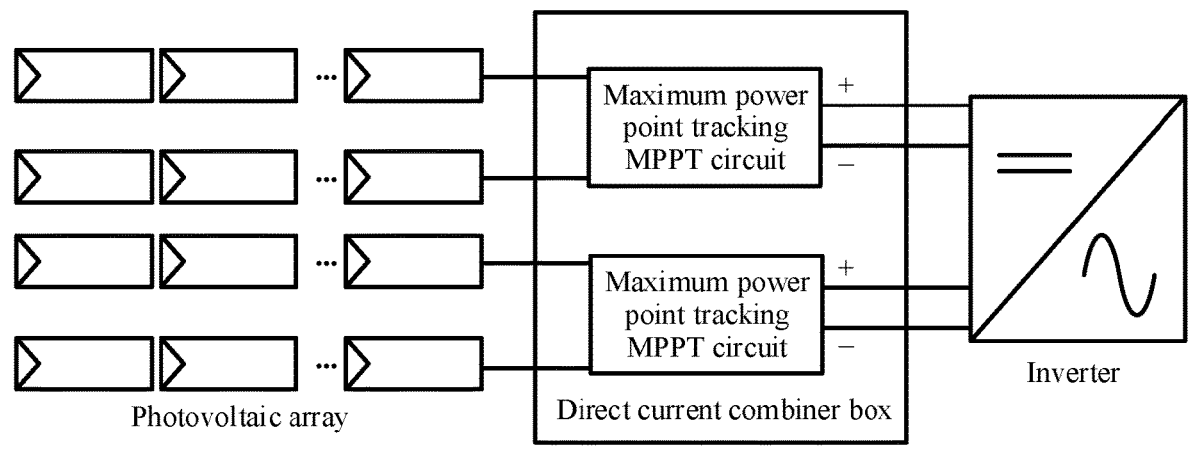
FIG. 2 is a schematic diagram of a scenario of another photovoltaic power generation system.

However, with gradual development of the photovoltaic power generation system, currently, a plurality of MPPT circuits in the photovoltaic power generation system are integrated into one direct current combiner box. As shown in FIG. 2, in a photovoltaic power generation system shown in FIG. 2, personal safety of installation personnel or maintenance personnel on site is still threatened in the following cases: a cable connecting a photovoltaic array to an input side of the direct current combiner box is faulty, a cable connecting an inverter to an output side of the direct current combiner box is faulty, or a fault occurs inside the direct current combiner box.

This application provides a direct current combiner box. The direct current combiner box may determine, by detecting an operating parameter of the direct current combiner box, whether the direct current combiner box operates normally, and when the direct current combiner box works abnormally, control a boost circuit in the direct current combiner box, to convert a voltage of the photovoltaic array connected to the direct current combiner box into a voltage lower than a safety voltage for output. In this way, safety of installation personnel or maintenance personnel on the site of a photovoltaic power generation system can be protected.

The following describes in detail a direct current combiner box provided in this application through the following embodiments and with reference to the accompanying drawings.

Embodiment 1

Figure 3:
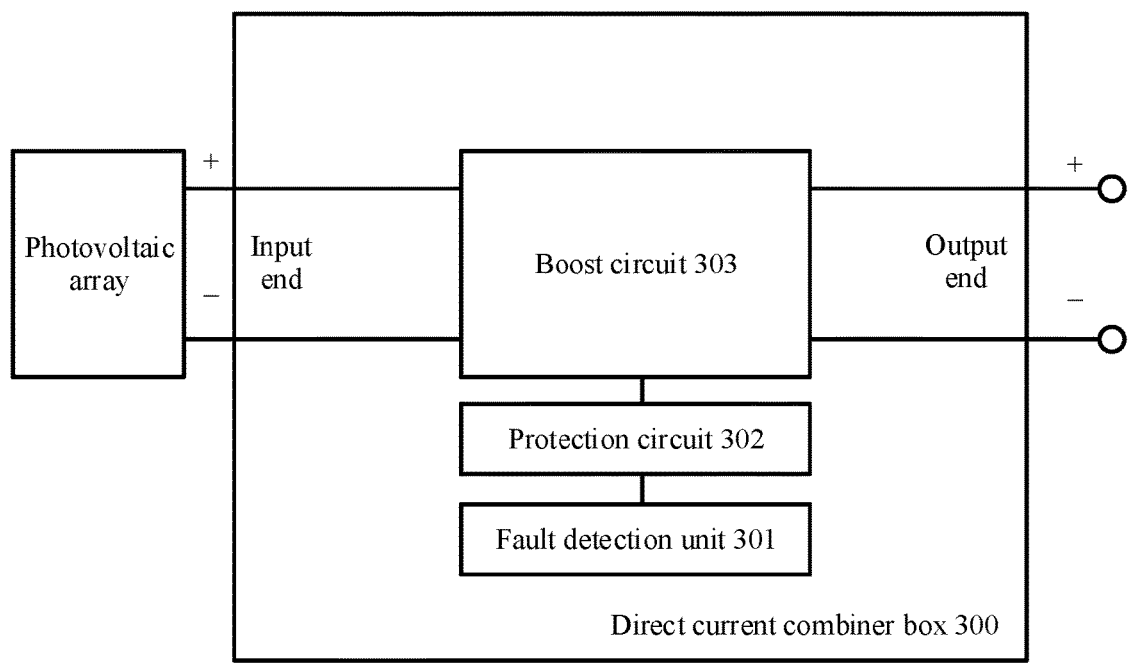
FIG. 3 is a schematic diagram of a structure of a direct current combiner box.

FIG. 3 is a schematic diagram of a structure of a direct current combiner box according to an embodiment of this application. Referring to FIG. 3, the direct current combiner box 300 includes a fault detection unit 301, a protection circuit 302, and a boost circuit 303. An input end of the direct current combiner box 300 is coupled to a photovoltaic array.

The fault detection unit 301 is configured to detect an operating parameter of the direct current combiner box 300, where the operating parameter includes at least one of a residual current at an output end of the direct current combiner box 300, first insulation impedance to ground of the direct current combiner box 300, and an input voltage at an input end of the direct current combiner box 300.

The protection circuit 302 is configured to send a protection signal to the boost circuit 303 when the operating parameter meets a specified condition. The protection signal is used to enable the boost circuit 303 to adjust a first voltage of the photovoltaic array at the input end of the direct current combiner box 300 to a second voltage. The second voltage is a zero voltage or a non-zero voltage not higher than a safety voltage. The specified condition includes at least one of the following: the residual current is greater than a first threshold, the first insulation impedance to ground is less than a second threshold, and the input voltage is greater than a third threshold.

The boost circuit 303 is configured to: after receiving the protection signal, adjust the first voltage of the photovoltaic array at the input end of the direct current combiner box 300 to the second voltage.

When a cable between the direct current combiner box 300 and the photovoltaic array is faulty, or a fault occurs in the direct current combiner box 300, or a cable on an output side of the direct current combiner box 300 is faulty, and a person on site touches the cable or the direct current combiner box 300, the residual current on the output side of the direct current combiner box 300 exceeds a range specified in a safety specification, and poses a safety threat to personnel on site. In addition, when a voltage of the photovoltaic array is excessively high, a security threat is also posed to personnel on site. In addition, when the insulation impedance to ground of the direct current combiner box 300 is excessively low, a security threat is also posed to the personnel on site. Therefore, to protect safety of the personnel on site, it is necessary to detect the operating parameter of the direct current combiner box 300. In addition, this embodiment of this application is not limited to the foregoing operating parameter. A person skilled in the art should know this.

Optionally, an operating parameter of each direct current combiner box 300 corresponds to a preset threshold or a preset value range. When the operating parameter exceeds the preset threshold or the preset range, it is determined that the direct current combiner box 300 or a cable connecting to the direct current combiner box 300 is faulty. A voltage transmitted by the photovoltaic array to the input end of the direct current combiner box 300 may be reduced to a safety voltage to protect safety of the personnel.

The protection circuit 302 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. Alternatively, the processor may be a combination of processors implementing a computing function. For example, the protection circuit 302 may include a combination of one or more microprocessors, a combination of a DSP and a microprocessor, or the like. The protection circuit 302 may receive the operating parameter of the direct current combiner box 300 sent by the fault detection unit 301. The protection circuit 302 determines whether the operating parameter of the direct current combiner box 300 exceeds a preset threshold or a preset value range. When the operating parameter exceeds the corresponding preset threshold or preset range, the protection circuit 302 may send a protection signal to the boost circuit 303, so that the voltage transmitted by the photovoltaic array to the input end of the direct current combiner box 300 is reduced to the safety voltage. In addition, the protection circuit 302 may further include an analog-to-digital converter (analog-to-digital converter, ADC), which is configured to convert an analog quantity input by the fault detection unit 301 into a digital quantity.

Figure 4:
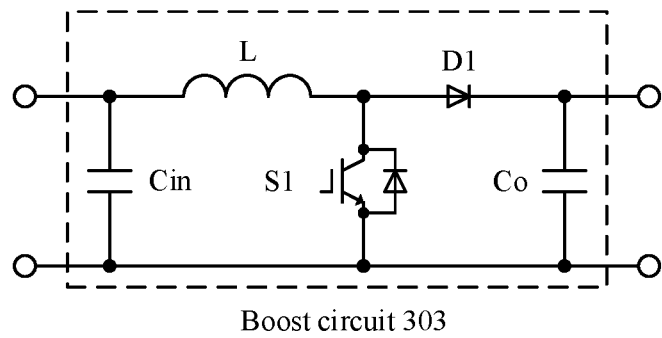
FIG. 4 is a schematic diagram of a structure of a boost circuit.

The boost circuit 303 in the direct current combiner box 300 may be a BOOST (boost) circuit. For a circuit topology structure of the boost circuit 303, refer to FIG. 4. As shown in FIG. 4, the boost circuit 303 includes an inductor L, a main transistor S1, a diode D1, an input capacitor Cin, and an output capacitor Co. The main transistor S1 in this embodiment of this application may be one of a plurality of types of switching transistors such as a metal-oxide-semiconductor field-effect transistor (MOSFET), a bipolar junction transistor (BJT), and an insulated gate bipolar transistor (IGBT). Details are not listed in this embodiment of this application. The main transistor S1 further includes a diode that is connected in reverse parallel with the main transistor S1. The main transistor S1 may include a first electrode, a second electrode, and a control electrode. The control electrode is configured to control turn-on and turn-off of a switch device. When the main transistor S1 is turned on, a current may be transmitted between the first electrode and the second electrode of the main transistor S1. When the main transistor S1 is turned off, a current cannot be transmitted between the first electrode and the second electrode of the main transistor S1.

After it is determined that the direct current combiner box 300 or the cable connecting to the direct current combiner box 300 is faulty, the protection circuit 302 sends the protection signal to the boost circuit 303, to reduce the voltage transmitted by the photovoltaic array to the input end of the direct current combiner box 300 to the safety voltage.

In an implementation, the protection signal may be a straight-through signal. The straight-through signal is used to control S1 in the boost circuit 303 to keep turned on, so as to short-circuit the photovoltaic array through the inductor L and the main transistor S1, and finally reduce the voltage of the photovoltaic array to the safety voltage or to a voltage close to 0 V. This eliminates a threat posed by the residual current caused by the voltage of the photovoltaic array and protects safety of the personnel.

In another implementation, the protection signal may be a pulse width modulation (PWM) signal, and a proper duty cycle is set to control turn-on and turn-off of the main transistor S1, so as to reduce the voltage of the photovoltaic array to the safety voltage or to a voltage close to 0 V. This eliminates the threat posed by the residual current caused by the voltage of the photovoltaic array and protects safety of the personnel. When the voltage of the photovoltaic array is reduced to the safety voltage, the low voltage of the photovoltaic array can support the boost circuit 303 and some other auxiliary circuits in the direct current combiner box 300 continuing operation.

Figure 5:
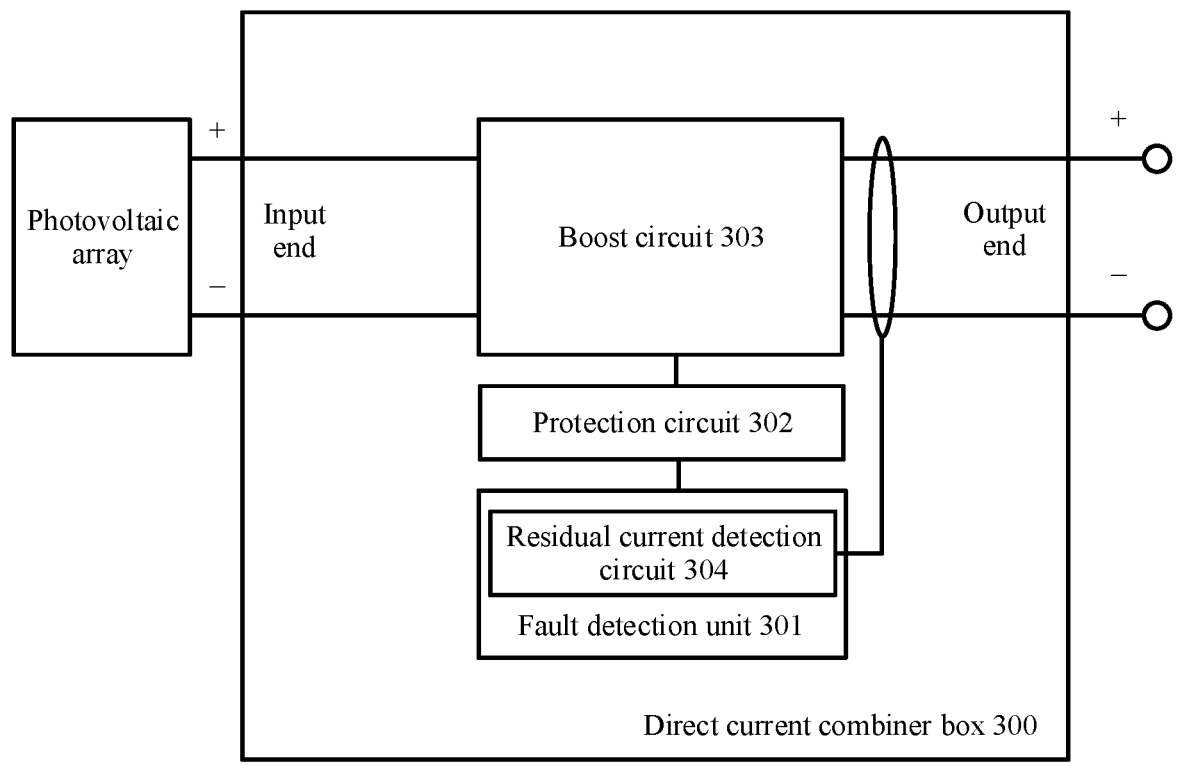
FIG. 5 is a schematic diagram of a structure of a direct current combiner box including a residual current detection circuit.

In some possible implementations, the fault detection unit 301 includes a residual current detection circuit 304 to detect the residual current of the direct current combiner box 300. As shown in FIG. 5, the residual current detection circuit 304 is configured to: detect the residual current at the output end of the direct current combiner box 300, and send the residual current to the protection circuit 302.

In an implementation, an input end of the boost circuit 303 is connected to the input end of the direct current combiner box 300, and an output end of the boost circuit 303 is connected to the output end of the direct current combiner box 300 through the residual current detection circuit 304. The residual current detection circuit 304 detects the residual current at the output end of the direct current combiner box 300, and sends the residual current to the protection circuit 302. The protection circuit 302 determines, by determining a relationship between the residual current and the first threshold, whether to send the protection signal to the boost circuit 303. When the residual current is greater than the first threshold, the protection signal is sent to the boost circuit 303, so that the boost circuit 303 adjusts the first voltage of the photovoltaic array at the input end of the direct current combiner box 300 to the second voltage, where the second voltage is a zero voltage or a non-zero voltage not higher than the safety voltage, thereby protecting safety of the personnel.

Figure 6:
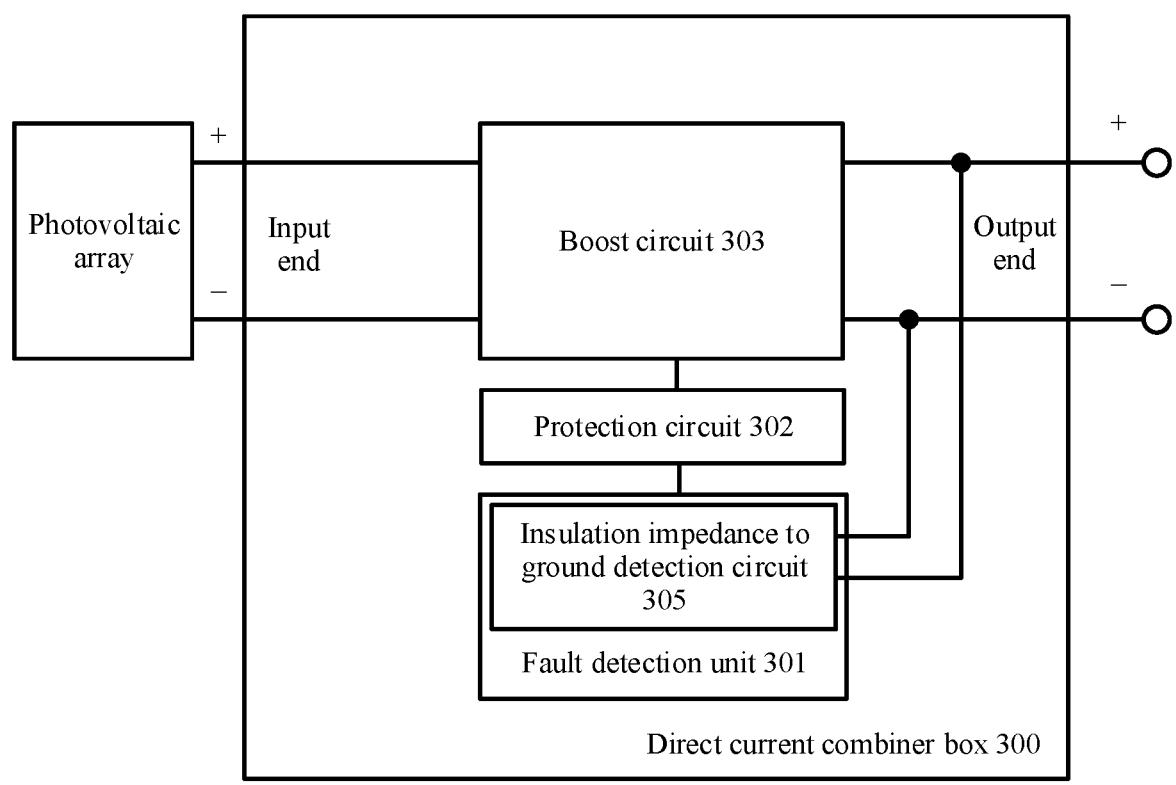
FIG. 6 is a schematic diagram of a structure of a direct current combiner box including an insulation impedance detection circuit.

In some possible implementations, the fault detection unit includes an insulation impedance detection circuit 305 to detect the insulation impedance to ground of the direct current combiner box 300. As shown in FIG. 6, the insulation impedance detection circuit 305 is configured to: detect the first insulation impedance to ground of the direct current combiner box 300, and send the first insulation impedance to ground to the protection circuit 302.

Optionally, the input end of the boost circuit 303 is connected to the input end of the direct current combiner box 300, and the output end of the boost circuit 303 is connected to the output end of the direct current combiner box 300. The input end of the direct current combiner box 300 includes a positive output end and a negative output end. One end of the insulation impedance detection circuit 305 is connected to the positive output end of the direct current combiner box 300, and the other end of the insulation impedance detection circuit 305 is connected to the negative output end of the direct current combiner box 300. The insulation impedance detection circuit 305 determines the first insulation impedance to ground of the direct current combiner box, and sends the first insulation impedance to ground to the protection circuit 302. The protection circuit 302 determines, by determining a relationship between the first insulation impedance to ground and the second threshold, whether to send the protection signal to the boost circuit 303. When the first insulation impedance to ground is less than the second threshold, the protection signal is sent to the boost circuit 303, so that the boost circuit 303 adjusts the first voltage of the photovoltaic array at the input end of the direct current combiner box 300 to the second voltage, where the second voltage is a zero voltage or a non-zero voltage not higher than the safety voltage, thereby protecting safety of the personnel.

Figure 7:
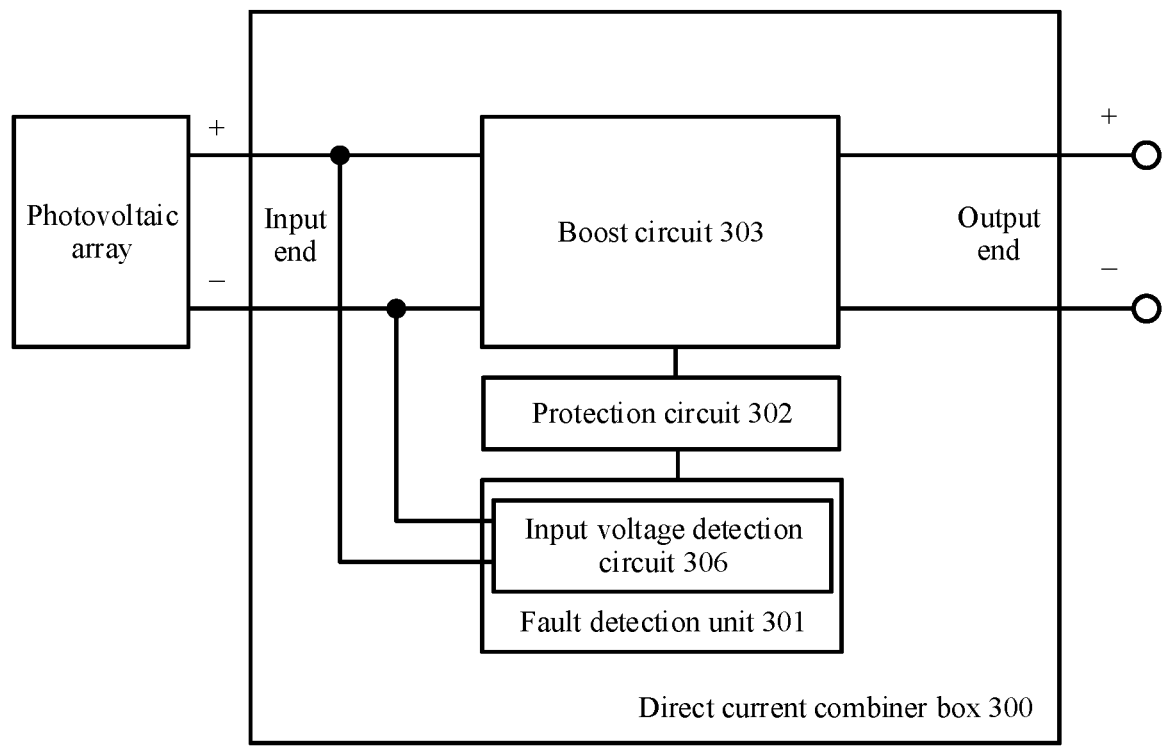
FIG. 7 is a schematic diagram of a structure of a direct current combiner box including an input voltage detection circuit.

In some possible implementations, the fault detection unit 301 includes an input voltage detection circuit 306 to detect the input voltage of the photovoltaic array. As shown in FIG. 7, the input voltage detection circuit 306 is configured to: detect the input voltage transmitted by the photovoltaic array to the direct current combiner box 300, and send the input voltage to the protection circuit 302.

Optionally, the input end of the boost circuit 303 is connected to the input end of the direct current combiner box 300, and the output end of the boost circuit 303 is connected to the output end of the direct current combiner box 300. The input end of the direct current combiner box 300 includes a positive input end and a negative input end. One end of the input voltage detection circuit 306 is connected to the positive input end of the direct current combiner box 300, and the other end of the input voltage detection circuit 306 is connected to the negative input end of the direct current combiner box 300. In this way, the input voltage detection circuit 306 obtains the input voltage of the direct current combiner box and sends the input voltage to the protection circuit 302. The protection circuit 302 determines, by determining a relationship between the input voltage and the third threshold, whether to send the protection signal to the boost circuit 303. When the input voltage is greater than the third threshold, the protection signal is sent to the boost circuit 303, so that the boost circuit 303 adjusts the first voltage of the photovoltaic array at the input end of the direct current combiner box 300 to the second voltage, where the second voltage is a zero voltage or a non-zero voltage not higher than the safety voltage, thereby protecting safety of the personnel.

Figure 8:
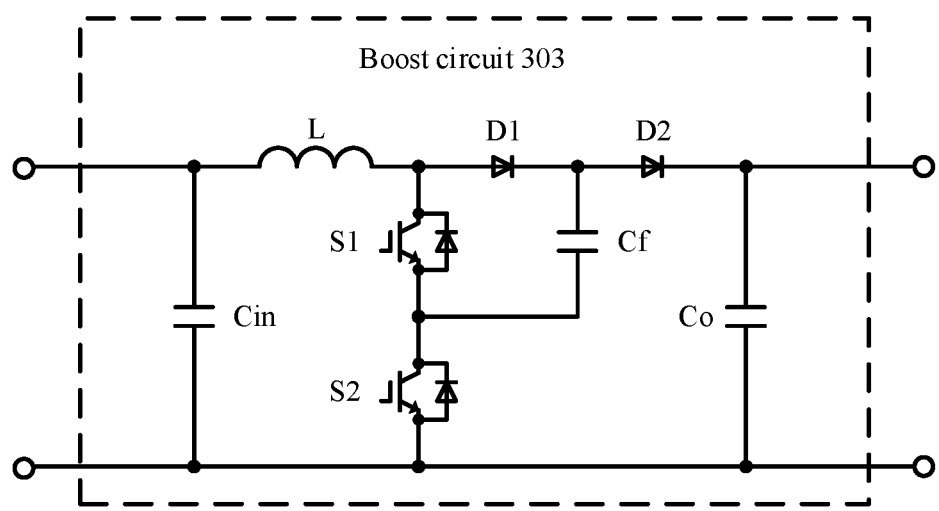
FIG. 8 is a schematic diagram of a structure of a flying-capacitor three-level BOOST circuit.

Because the boost circuit 303 is not limited to a conventional two-level structure, some boost circuits may be three-level DC/DC conversion circuits. For example, the boost circuit 303 may alternatively be a flying-capacitor three-level BOOST circuit. As shown in FIG. 8, the flying-capacitor three-level BOOST circuit includes an inductor L, main transistors S1 and S2, diodes D1 and D2, a flying capacitor Cf, an input capacitor Cin, and an output capacitor Co. The main transistor S2 may also be one of a plurality of types of switching transistors such as a metal-oxide-semiconductor field-effect transistor, a bipolar junction transistor, and an insulated gate bipolar transistor.

Optionally, the protection circuit 302 controls, through the protection signal, the main transistor S1 and the main transistor S2 in the flying-capacitor three-level BOOST circuit to be turned on and turned off, to reduce the voltage of the photovoltaic array to the safety voltage or to a voltage close to 0 V, thereby eliminating a threat posed by a residual current caused by the voltage of the photovoltaic array, and protecting safety of the personnel. It should b e noted that the boost circuit 303 in this embodiment of this application may be various types of boost circuits. The boost circuit usually includes a switch device. The photovoltaic array is short-circuited through the switch device, to reduce the voltage of the photovoltaic array to the safety voltage, thereby eliminating the threat posed by the residual current and protecting safety of the personnel. This is not limited herein.

In an implementation, a manner indicated by the protection signal in the foregoing embodiment may include at least one of the following: straight-through, a pulse width modulation method, a phase modulation method, and a frequency modulation method. The first voltage of the photovoltaic array may be adjusted to the second voltage in the foregoing manner. A person skilled in the art should know a specific modulation scheme. Details are not described herein.

Figure 9:
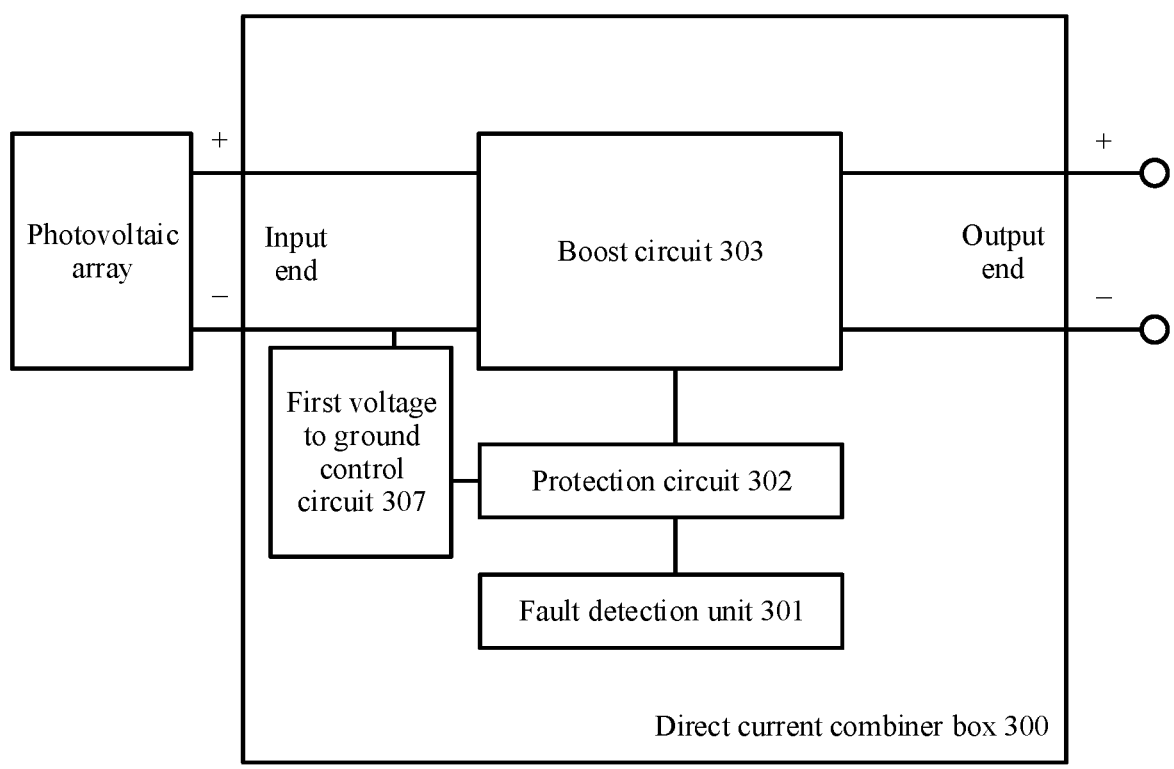
FIG. 9 is a schematic diagram of a structure of a direct current combiner box including a voltage to ground control circuit.

When the photovoltaic array transmits the voltage to the direct current combiner box 300, the boost circuit 303 in the direct current combiner box 300 may be at a floating potential. Therefore, the voltage transmitted by the photovoltaic array to the direct current combiner box 300 may be not high, but a voltage to ground of the direct current combiner box 300 is still quite high. An excessively high voltage to ground also poses a threat to safety of the personnel on site. The direct current combiner box 300 further includes a first voltage to ground control circuit 307 to control the voltage to ground of the direct current combiner box 300. As shown in FIG. 9, the input end of the direct current combiner box 300 includes the positive input end and the negative input end, and the first voltage to ground control circuit 307 is coupled to the negative input end of the direct current combiner box 300. The protection circuit 302 is further configured to: when determining that the operating parameter meets the specified condition, send a first voltage control signal to the first voltage to ground control circuit 307. The first voltage to ground control circuit 307 is configured to adjust a voltage to ground at the negative input end of the direct current combiner box 300 to a third voltage based on the first voltage control signal, where the third voltage is not higher than the safety voltage.

Optionally, a first end of the first voltage to ground control circuit 307 is connected to the negative input end of the direct current combiner box 300, and a second end of the first voltage to ground control circuit 307 is connected to the protection circuit 302. The protection circuit 302 sends the first voltage control signal to the first voltage to ground control circuit 307 when determining that the operating parameter meets the specified condition. The first voltage control signal is used to indicate the first voltage to ground control circuit 307 to adjust the voltage to ground at the negative input end of the direct current combiner box to the third voltage, where the third voltage is also not higher than the safety voltage. Because the voltage to ground at the negative input end of the direct current combiner box 300 is already lower than the safety voltage, a voltage to ground at a negative end of the photovoltaic array connected to the negative input end of the direct current combiner box 300 is also lower than the safety voltage. In addition, because the voltage of the photovoltaic array is already reduced to a relatively low voltage, a voltage to ground of the photovoltaic array may be controlled to be also lower than the safety voltage. Through the first voltage to ground control circuit 307, when a fault occurs, both a positive end and the negative end of the photovoltaic array can be lower than the safety voltage, thereby further protecting safety of the personnel.

To more accurately determine the insulation impedance to ground of the direct current combiner box 300 and implement a function of automatically restoring operation of a power device after the fault is cleared, the protection circuit 302 is further configured to send a second voltage control signal to the first voltage to ground control circuit 307 after first duration has ended since the first voltage control signal is sent to the first voltage to ground control circuit 307. The first voltage to ground control circuit 307 is further configured to adjust the voltage to ground at the negative input end of the direct current combiner box 300 to a fourth voltage based on the second voltage control signal, where the fourth voltage is not higher than the safety voltage. The protection circuit 302 is further configured to: determine second insulation impedance to ground of the direct current combiner box 300 based on the residual current at the output end of the direct current combiner box 300 and the fourth voltage; and when the second insulation impedance to ground is greater than a fourth threshold, stop sending the protection signal to the boost circuit 303.

Optionally, when sending the protection signal to the boost circuit 303, the protection circuit 302 further sends the first voltage control signal to the first voltage to ground control circuit. Therefore, the first voltage of the photovoltaic array at the input end of the direct current combiner box 300 may be adjusted to the second voltage, and the voltage to ground at the negative input end of the direct current combiner box 300 may be adjusted to the third voltage. Then, after the first duration, the protection circuit 302 sends the second voltage control signal to the first voltage to ground control circuit, so that the voltage to ground at the negative input end of the direct current combiner box 300 is adjusted to the fourth voltage.

The second voltage control signal may be the same as the first voltage control signal. When the second voltage control signal is the same as the first voltage control signal, the fourth voltage is equal to the third voltage, and both are lower than the safety voltage. In addition, detection is performed on insulation impedance to ground of the direct current combiner box 300 when the voltage to ground of the direct current combiner box 300 is high, so that detection on the insulation impedance to ground is more precise. The second voltage control signal may alternatively be different from the first voltage control signal, so that the fourth voltage is slightly higher than the third voltage, and the second insulation impedance to ground of the direct current combiner box 300 is more accurately determined. In addition, the protection circuit 302 may further determine, based on the second insulation impedance to ground, whether the fault in the direct current combiner box 300 is cleared. When the residual current is greater than the first threshold, the protection circuit 302 sends the protection signal to the boost circuit 303, so that the direct current combiner box 300 enters a protection state. When the second insulation impedance to ground is greater than the fourth threshold, the protection circuit 302 does not send the protection signal to the boost circuit 303, so that the direct current combiner box 300 exits the protection state, and the direct current combiner box 300 restores to a normal operation state. Through the control manner provided in the foregoing embodiment, while the insulation impedance to ground of the direct current combiner box 300 can be more accurately determined, after the fault in the direct current combiner box 300 is cleared, the device can automatically restore operation without manual intervention, which improves automation of the device and reduces maintenance costs.

Figure 10:
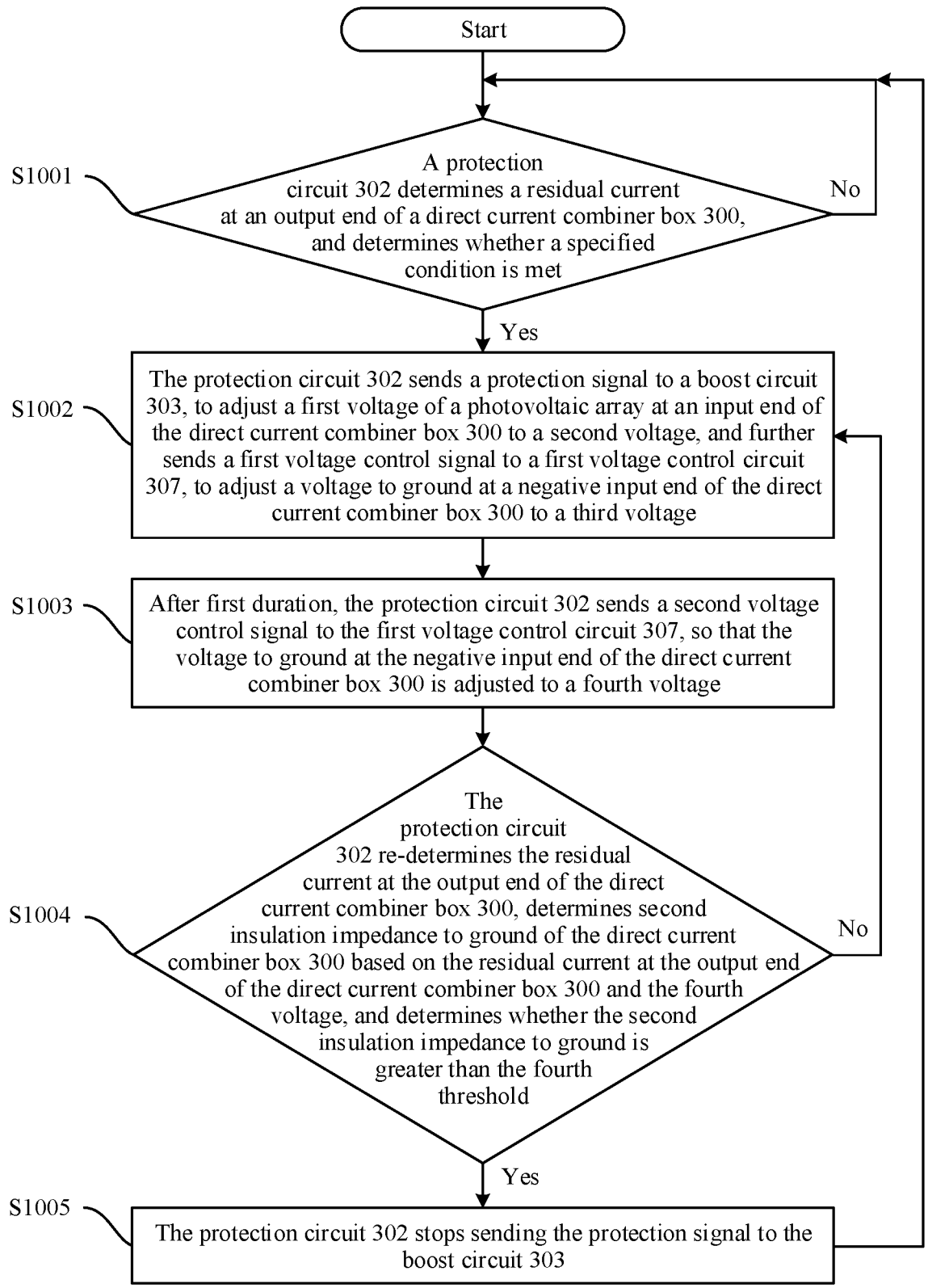
FIG. 10 is a schematic flowchart of a control method performed by a protection circuit.

For the foregoing control manner, this application provides a control method performed by the protection circuit. FIG. 10 is a schematic flowchart of the control method performed by the protection circuit. The method includes the following steps.

Step S1001: The protection circuit 302 determines a residual current at the output end of the direct current combiner box 300, and determines whether the operating parameter meets the specified condition. If the operating parameter meets a specified condition, step S1002 is performed; or if the operating parameter does not meet the specified condition, step S1001 is continued.

Step S1002: The protection circuit 302 sends a protection signal to the boost circuit 303, to adjust the first voltage of the photovoltaic array at the input end of the direct current combiner box 300 to the second voltage, and further sends the first voltage control signal to the first voltage control circuit control circuit 307, to adjust a voltage to ground at the negative input end of the direct current combiner box 300 to the third voltage.

Step S1003: After the first duration, the protection circuit 302 sends the second voltage control signal to the first voltage control circuit, so that the voltage to ground at the negative input end of the direct current combiner box 300 is adjusted to the fourth voltage.

Step S1004: The protection circuit 302 re-determines the residual current at the output end of the direct current combiner box 300, determines the second insulation impedance to ground of the direct current combiner box 300 based on the residual current at the output end of the direct current combiner box 300 and the fourth voltage, and determines whether the second insulation impedance to ground is greater than the fourth threshold. If the second insulation impedance to ground is less than the fourth threshold, step S1002 is performed; if the second insulation impedance to ground is greater than the fourth threshold, step S1005 is performed.

Step S1005: The protection circuit 302 stops sending the protection signal to the boost circuit 303. Then, step S1001 is performed.

Figure 11:
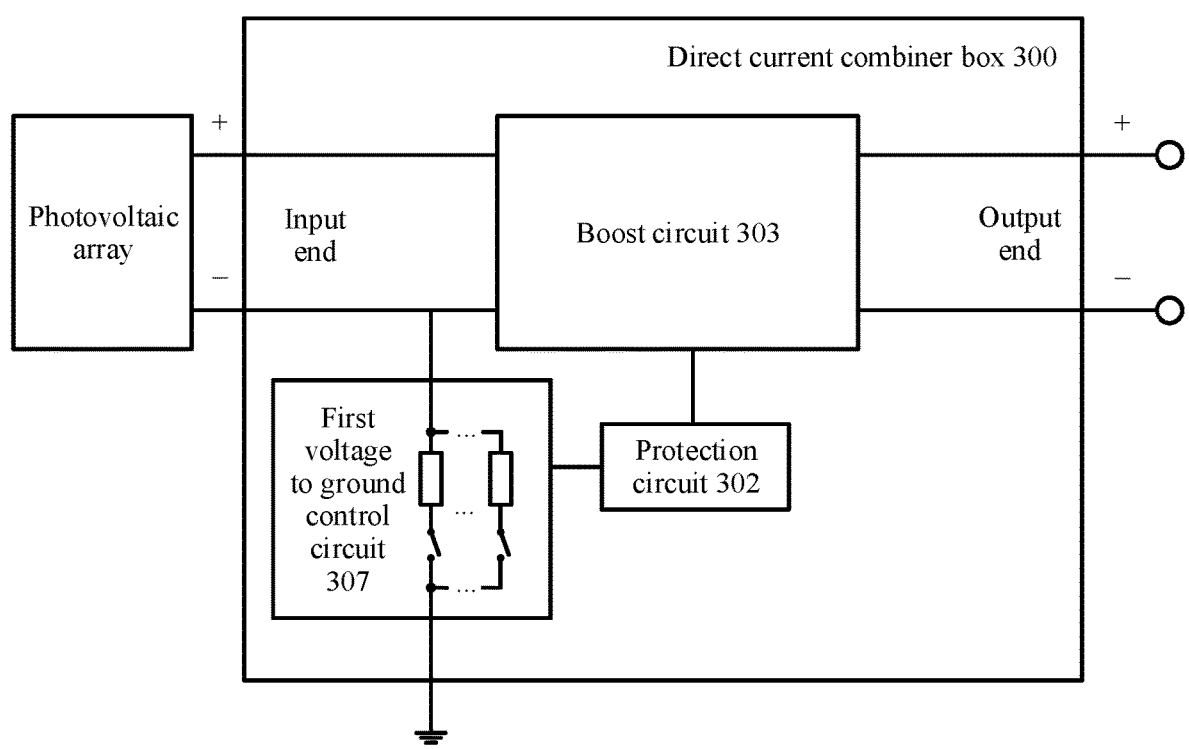
FIG. 11 is a schematic diagram of a structure of a voltage to ground control circuit.

In an implementation, as shown in FIG. 11, the first voltage to ground control circuit 307 further includes N resistors and N controllable switches. The N resistors are in a one-to-one correspondence with the N controllable switches. Each resistor is coupled to a corresponding controllable switch, and each resistor and the corresponding controllable switch form a controllable resistor. A first end of each controllable resistor is coupled to the negative input end of the direct current combiner box 300, and a second end of each controllable resistor is coupled to ground. The first voltage to ground control circuit 307 is specifically configured to: close a target controllable switch in the N controllable switches based on the first voltage control signal, to adjust the voltage to ground at the negative input end of the direct current combiner box to the third voltage. Optionally, a voltage to ground at a negative input end of the boost circuit 303 can be adjusted by controlling turn-on and turn-off of the controllable switches on the controllable resistors formed by the N resistors and the N controllable switches, so as to protect safety of the personnel.

Figure 12:
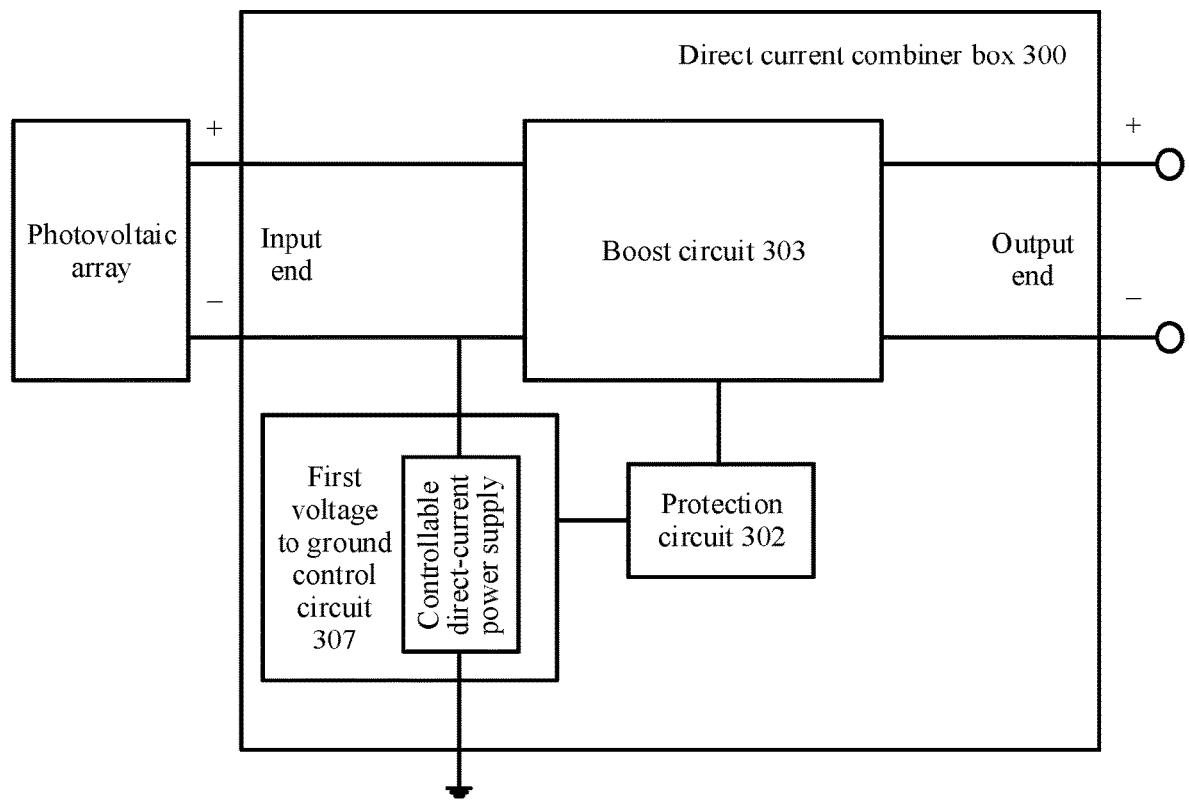
FIG. 12 is a schematic diagram of a structure of another voltage to ground control circuit.

In another implementation, as shown in FIG. 12, the first voltage to ground control circuit 307 includes a controllable direct-current power supply. One end of the controllable direct-current power supply is coupled to the negative input end of the boost circuit 303, and the other end is coupled to ground. The controllable direct-current power supply is controlled to directly adjust the voltage to ground at the negative input end of the boost circuit 303, so as to protect safety of the personnel.

Figure 13:
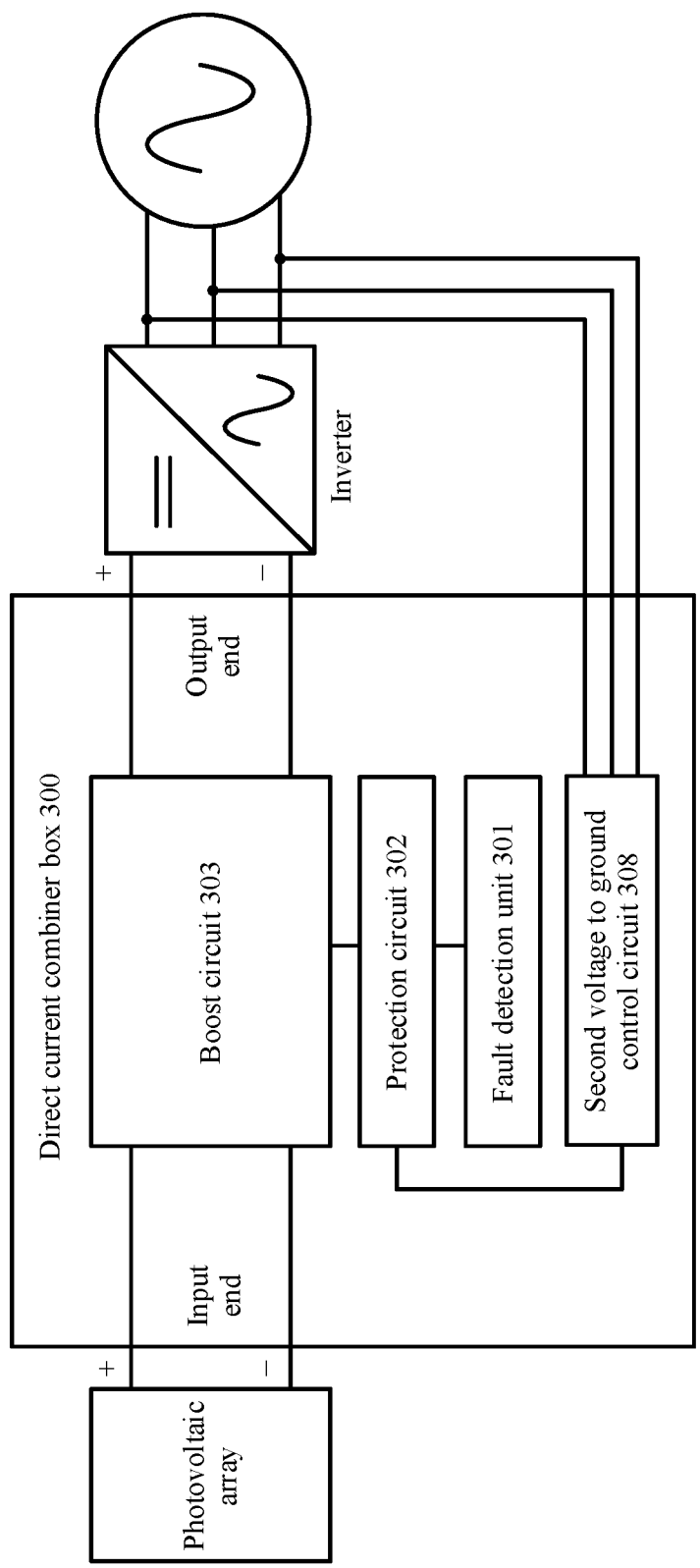
FIG. 13 is a schematic diagram of a structure of a voltage to ground control circuit applied to an alternating current phase line.

The controllable direct-current power supply can be used to adjust a voltage to ground of an alternating current phase line, and indirectly adjust the voltage to ground of the negative input end of the boost circuit 303. In an implementation, as shown in FIG. 13, the output end of the direct current combiner box 300 is further coupled to an inverter. The input end of the direct current combiner box 300 includes a positive input end and a negative input end. An output end of the inverter includes at least one alternating current phase line. The direct current combiner box 300 further includes a second voltage to ground control circuit 308. The second voltage to ground control circuit 308 is coupled to the at least one alternating current phase line of the inverter. The protection circuit 302 is further configured to: when determining that the operating parameter meets the specified condition, send a third voltage control signal to the second voltage to ground control circuit 308. The second voltage to ground control circuit 308 is configured to adjust a voltage to ground of the at least one alternating current phase line to a fifth voltage based on the third voltage control signal, so that a voltage to ground at the negative input end of the direct current combiner box 300 is adjusted to a sixth voltage, where the sixth voltage is not higher than the safety voltage. The second voltage to ground control circuit 308 may also include a controllable resistor or a controllable direct-current power supply, to adjust the voltage to ground at the negative input end of the direct current combiner box 300, so as to protect safety of the personnel. For a specific connection manner and an implementation, refer to the embodiment corresponding to FIG. 11 and FIG. 12. Details are not described herein again.

Figure 14:
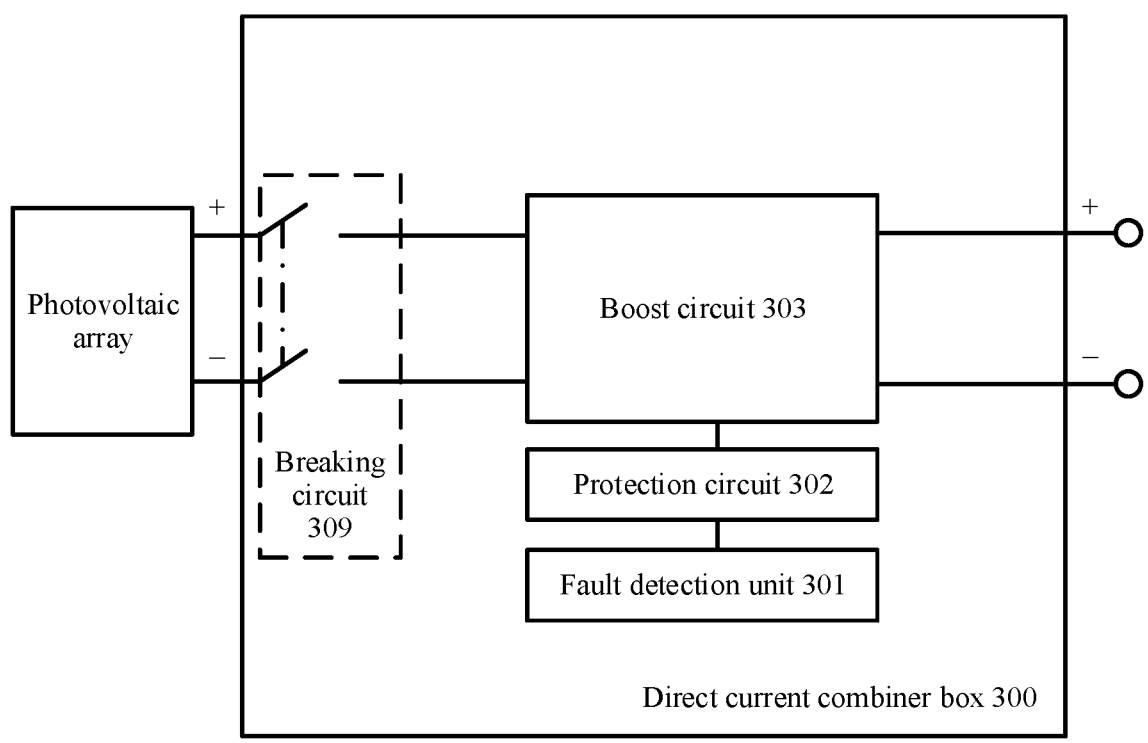
FIG. 14 is a schematic diagram of a structure of a direct current combiner box including a breaking circuit.

Because a switch device inside the boost circuit 303 may also be damaged, in this case, if the protection signal is sent to the boost circuit 303, it is difficult to control the voltage of a photovoltaic array at the input end of the direct current combiner box 300. When the direct current combiner box 300 or the cable connecting to the direct current combiner box 300 is faulty, it is difficult to protect safety of the personnel on site. In view of this, in an implementation, the direct current combiner box 300 further includes a breaking circuit 309. As shown in FIG. 14, the breaking circuit 309 is coupled between the input end of the boost circuit 303 and the input end of the direct current combiner box 300. The protection circuit 302 is further configured to: after third duration has ended since the protection signal is sent to the boost circuit 303, determine whether the operating parameter meets the specified condition; and send a breaking signal to the breaking circuit 309 when determining that the operating parameter meets the specified condition. The breaking signal is used to enable the breaking circuit 309 to break a connection between the input end of the boost circuit 303 and the input end of the direct current combiner box 300. The breaking circuit 309 is configured to break, based on the breaking signal, the connection between the input end of the boost circuit 303 and the input end of the direct current combiner box 300. A breaking switch in the breaking circuit 309 can turn off a switch based on an effective breaking signal, to disconnect input of the direct current combiner box 300 from the photovoltaic array. This reliably ensures safety of the personnel. This embodiment is used as a backup means when the boost circuit 303 is short-circuited or in poor contact, or the residual current is still relatively large after the photovoltaic array is short-circuited, so as to further protect safety of the personnel.

In addition, in another implementation, the protection circuit 302 is further configured to: after fourth duration has ended since the first voltage control signal is sent to the first voltage to ground control circuit 307, determine whether the operating parameter meets the specified condition; and send a breaking signal to the breaking circuit 309 when determining that the operating parameter meets the specified condition. The breaking signal is used to enable the breaking circuit 309 to break a connection between the input end of the boost circuit 303 and the input end of the direct current combiner box 300. The breaking circuit 309 is configured to break, based on the breaking signal, the connection between the input end of the boost circuit 303 and the input end of the direct current combiner box 300. According to this embodiment, the voltage to ground at the negative input end of the direct current combiner box 300 is adjusted to the third voltage through the first voltage to ground control circuit 307. In addition, when it is determined, after the fourth duration, that the operating parameter still meets the specified condition, as a backup means, this embodiment prevents a problem that the boost circuit 303 is short-circuited or in poor contact or the residual current is still large after the photovoltaic array is short-circuited, and the protection circuit 302 cannot protect safety of the personnel on site through the protection signal.

In an implementation, the protection circuit 302 is further configured to: determine whether the operating parameter of the direct current combiner box 300 exceeds a preset threshold or a preset value range, and send an alarm signal, so that the personnel on site can protect and repair the direct current combiner box 300 in real time. In addition, when the direct current combiner box 300 is faulty, another power device related to the direct current combiner box 300 is protected or disabled, thereby further protecting safety of the personnel.

In addition, in an actual application scenario, there is a case in which outputs of a plurality of direct current combiner boxes 300 are connected in parallel, or outputs of the direct current combiner boxes 300 are connected to another apparatus, where input ends of the direct current combiner boxes 300 are connected to respective independent photovoltaic arrays. The protection circuit 302 is further configured to: determine a current direction of the residual current, and send the protection signal to the boost circuit 303 only when it is determined that the operating parameter meets the specified condition and the current direction is a preset direction. In this way, when another direct current combiner box or another apparatus on the output side of the direct current combiner box 300 is faulty, the another apparatus itself performs protection, and the direct current combiner box 300 still operates normally. This increases a proportion of normally operating apparatuses in the system, further improves a power generation amount, and prevents false protection.

According to the direct current combiner box provided in this embodiment of this application, whether the direct current combiner box operates normally may be determined by detecting the operating parameter of the direct current combiner box. In addition, when the direct current combiner box operates abnormally, the boost circuit is controlled to convert the voltage of the photovoltaic array into a voltage lower than the safety voltage for output. Therefore, safety of installation personnel or maintenance personnel on the site of a photovoltaic power generation system is protected, and the direct current combiner box can automatically restore operation after a fault is cleared. This improves automation of the direct current combiner box, and reduces maintenance costs.

Embodiment 2

Figure 15:
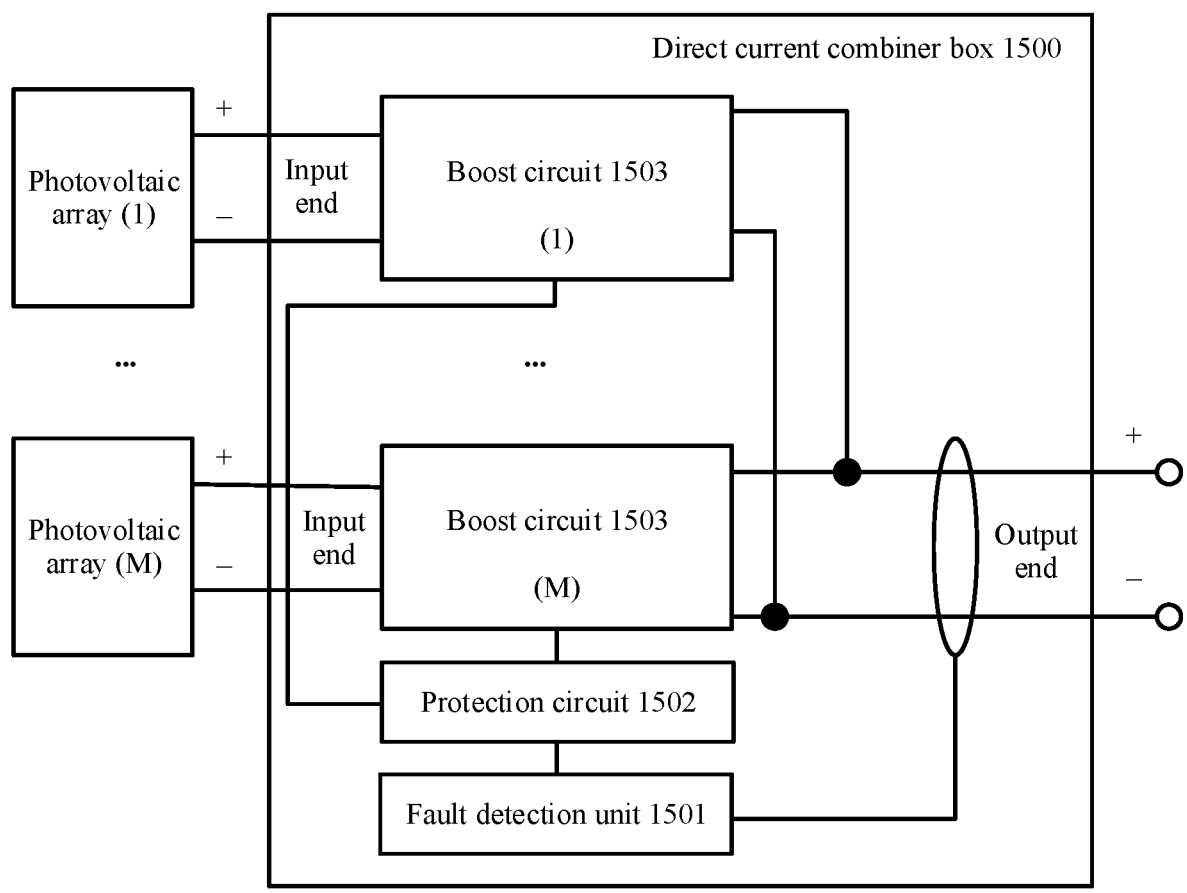
FIG. 15 is a schematic diagram of a structure of another direct current combiner box.

FIG. 15 is a schematic diagram of a structure of a direct current combiner box according to an embodiment of this application. Referring to FIG. 15, the direct current combiner box 1500 includes a fault detection unit 1501, M boost circuits 1503, and a protection circuit 1502. Input ends of the direct current combiner box 1500 are coupled to the M photovoltaic arrays in a photovoltaic power generation system. The M photovoltaic arrays are in a one-to-one correspondence with the M boost circuits 1503, and each photovoltaic array is coupled to a corresponding boost circuit 1503. M is a positive integer.

The fault detection unit 1501 is configured to detect an operating parameter of the direct current combiner box

1500. The operating parameter includes at least one of a residual current at an output end of the direct current combiner box 1500, first insulation impedance to ground of the direct current combiner box 1500, and an input voltage transmitted by the photovoltaic array to the input end of the direct current combiner box 1500.

The protection circuit 1502 is configured to: when the operating parameter meets a specified condition, send a first protection signal to a first boost circuit in the M boost circuits 1503, and send a second protection signal to a second boost circuit in the M boost circuits 1503. The first protection signal is used to enable the first boost circuit to adjust a first voltage of a photovoltaic array at the input end of the direct current combiner box 1500 to a second voltage. The second protection signal is used to enable the second boost circuit to adjust a first voltage of a photovoltaic array at the input end of the direct current combiner box 1500 to a ninth voltage. The ninth voltage is a zero voltage or a non-zero voltage not higher than a safety voltage, the ninth voltage is lower than the second voltage, and the second voltage is not higher than the safety voltage. The specified condition includes at least one of the following: the residual current is greater than a first threshold, the first insulation impedance to ground is less than a second threshold, and the input voltage is greater than a third threshold. The first boost circuit is configured to: after receiving the first protection signal, adjust the first voltage of the photovoltaic array at the input end of the direct current combiner box 1500 to the second voltage. The second boost circuit is configured to: after receiving the second protection signal, adjust the first voltage of the photovoltaic array at the input end of the direct current combiner box 1500 to the ninth voltage. In this embodiment, a low voltage of the photovoltaic array corresponding to the first boost circuit can support the first boost circuit and some other auxiliary circuits in the direct current combiner box 1500 continuing operation. For possible implementations and beneficial effects of this embodiment of this application, refer to the descriptions of Embodiment 1. Details are not described herein again.

An embodiment of this application further provides a photovoltaic power generation system. The photovoltaic power generation system includes a photovoltaic array and a direct current combiner box. The direct current combiner box includes a fault detection unit, a protection circuit, and a boost circuit. An input end of the direct current combiner box is coupled to the photovoltaic array in the photovoltaic power generation system. The fault detection unit is configured to detect an operating parameter of the direct current combiner box. The operating parameter includes at least one of a residual current at an output end of the direct current combiner box, first insulation impedance to ground of the direct current combiner box, and an input voltage transmitted by the photovoltaic array to the input end of the direct current combiner box. The protection circuit is configured to send a protection signal to the boost circuit when the operating parameter meets a specified condition. The protection signal is used to enable the boost circuit to adjust a first voltage of the photovoltaic array at the input end of the direct current combiner box to a second voltage. The second voltage is a zero voltage or a non-zero voltage not higher than a safety voltage. The specified condition includes at least one of the following: the residual current is greater than a first threshold, the first insulation impedance to ground is less than a second threshold, and the input voltage is greater than a third threshold. The boost circuit is configured to: after receiving the protection signal, adjust the first voltage of the photovoltaic array at the input end of the direct current combiner box to the second voltage. For possible implementations and beneficial effects of this embodiment of this application, refer to the descriptions of Embodiment 1. Details are not described herein again.

An embodiment of this application further provides a photovoltaic power generation system. The photovoltaic power generation system includes M photovoltaic arrays. The direct current combiner box includes a fault detection unit, M boost circuits, and a protection circuit. Input ends of direct current combiner box are coupled to the M photovoltaic arrays in the photovoltaic power generation system. The M photovoltaic arrays are in a one-to-one correspondence with the M boost circuits, and each photovoltaic array is coupled to a corresponding boost circuit. M is a positive integer. The fault detection unit is configured to detect an operating parameter of the direct current combiner box. The operating parameter includes at least one of a residual current at an output end of the direct current combiner box, first insulation impedance to ground of the direct current combiner box, and an input voltage transmitted by the photovoltaic array to the input end of the direct current combiner box. The protection circuit is configured to: when the operating parameter meets a specified condition, send a first protection signal to a first boost circuit in the M boost circuits, and send a second protection signal to a second boost circuit in the M boost circuits. The first protection signal is used to enable the first boost circuit to adjust a first voltage of a photovoltaic array at the input end of the direct current combiner box to a second voltage. The second protection signal is used to enable the second boost circuit to adjust a first voltage of a photovoltaic array at the input end of the direct current combiner box to a ninth voltage. The ninth voltage is a zero voltage or a non-zero voltage not higher than a safety voltage, the ninth voltage is lower than the second voltage, and the second voltage is not higher than the safety voltage. The specified condition includes at least one of the following: the residual current is greater than a first threshold, the first insulation impedance to ground is less than a second threshold, and the input voltage is greater than a third threshold. The first boost circuit is configured to: after receiving the first protection signal, adjust the first voltage of the photovoltaic array at the input end of the direct current combiner box to the second voltage. The second boost circuit is configured to: after receiving the second protection signal, adjust the first voltage of the photovoltaic array at the input end of the direct current combiner box to the ninth voltage. For possible implementations and beneficial effects of this embodiment of this application, refer to the descriptions of Embodiment 2. Details are not described herein again.

An embodiment of this application further provides a fault detection method, applied to a photovoltaic power generation system. The system includes a photovoltaic array, a direct current combiner box, a controller, and an inverter apparatus. An input end of the direct current combiner box is coupled to the photovoltaic array in the photovoltaic power generation system, and an output end of the direct current combiner box is coupled to the inverter apparatus. The method includes: Adjusting, by the controller when an operating parameter meets a specified condition, at the input end of the direct current combiner box to a second voltage. The second voltage is a zero voltage or a non-zero voltage not higher than a safety voltage. The operating parameter includes at least one of a residual current at an output end of the direct current combiner box, first insulation impedance to ground of the direct current combiner box, and an input voltage transmitted by the photovoltaic array to the input end of the direct current combiner box. The specified condition includes at least one of the following: the residual current is greater than a first threshold, the first insulation impedance to ground is less than a second threshold, and the input voltage is greater than a third threshold. For possible implementations and beneficial effects of this embodiment of this application, refer to the descriptions of Embodiment 1. Details are not described herein again.

An embodiment of this application further provides a fault detection method, applied to a photovoltaic power generation system. The system includes M photovoltaic arrays, a direct current combiner box, a controller, and an inverter apparatus. Input ends of the direct current combiner box are coupled to the M photovoltaic arrays in the photovoltaic power generation system, and output ends of the direct current combiner box are coupled to the inverter apparatus. The direct current combiner box includes M boost circuits. The M photovoltaic arrays are in a one-to-one correspondence with the M boost circuits, and each photovoltaic array is coupled to a corresponding boost circuit. M is a positive integer. The method includes: The controller is configured to: when an operating parameter meets a specified condition, adjust a first voltage of a photovoltaic array that is corresponding to a first boost circuit and that is at the input end of the direct current combiner box to a second voltage, and adjust a first voltage of a photovoltaic array that is corresponding to a second boost circuit and that is at the input end of the direct current combiner box to a ninth voltage. The ninth voltage is a zero voltage or a non-zero voltage not higher than a safety voltage, the ninth voltage is lower than the second voltage, and the second voltage is not higher than the safety voltage. The operating parameter includes at least one of a residual current at an output end of the direct current combiner box, first insulation impedance to ground of the direct current combiner box, and an input voltage transmitted by the photovoltaic array to the input end of the direct current combiner box. The specified condition includes at least one of the following: the residual current is greater than a first threshold, the first insulation impedance to ground is less than a second threshold, and the input voltage is greater than a third threshold. For possible implementations and beneficial effects of this embodiment of this application, refer to the descriptions of Embodiment 2. Details are not described herein again.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a processor of a general-purpose computer, a dedicated computer, an embedded processor, or another programmable data processing device to generate a machine, so that the instructions executed by the processor of the computer or another programmable data processing device generate an apparatus for implementing a specific function in one or more procedures in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A direct current combiner box, for use in a photovoltaic power generation system, wherein an input end of the direct current combiner box is coupled to a photovoltaic array in the photovoltaic power generation system, and wherein the direct current combiner box comprises:
   a boost circuit;
   a fault detection unit configured to detect an operating parameter of the direct current combiner box, wherein the operating parameter comprises at least one of a residual current at an output end of the direct current combiner box, a first insulation impedance to ground of the direct current combiner box, or an input voltage transmitted by the photovoltaic array to the input end of the direct current combiner box; and
   a protection circuit configured to send a protection signal to the boost circuit when the operating parameter meets a specified condition, wherein the protection signal is used to enable the boost circuit to adjust a first voltage of the photovoltaic array at the input end of the direct current combiner box to a second voltage, the second voltage is a zero voltage or a non-zero voltage not higher than a safety voltage, and the specified condition comprises at least one of the following: the residual current is greater than a first threshold, the first insulation impedance to ground is less than a second threshold, or the input voltage is greater than a third threshold;
   wherein the boost circuit is configured to: after receiving the protection signal, adjust the first voltage of the photovoltaic array at the input end of the direct current combiner box to the second voltage.

2. The direct current combiner box according to claim 1, wherein the operating parameter comprises the residual current at the output end of the direct current combiner box; the fault detection unit comprises a residual current detection circuit; and the residual current detection circuit is configured to detect the residual current at the output end of the direct current combiner box.

3. The direct current combiner box according to claim 1, wherein the operating parameter comprises the first insulation impedance to ground of the direct current combiner box; the fault detection unit comprises an insulation impedance detection circuit; and
the insulation impedance detection circuit is configured to detect the first insulation impedance to ground of the direct current combiner box.

4. The direct current combiner box according to claim 1, wherein the operating parameter comprises the input voltage transmitted by the photovoltaic array to the input end of the direct current combiner box, and the fault detection unit comprises an input voltage detection circuit; and
the input voltage detection circuit is configured to detect the input voltage transmitted by the photovoltaic array to the input end of the direct current combiner box.

5. The direct current combiner box according to claim 1, wherein:
the boost circuit comprises any one of a two-level boost circuit or a three-level boost circuit, the two-level boost circuit or the three-level boost circuit comprises at least one switching transistor, and
the boost circuit is configured to control, in a manner indicated by the protection signal, the at least one switching transistor to be turned on and turned off, to adjust the first voltage of the photovoltaic array at the input end of the direct current combiner box to the second voltage.

6. The direct current combiner box according to claim 5, wherein the manner indicated by the protection signal comprises at least one of the following: straight-through, a pulse width modulation method, a phase modulation method, or a frequency modulation method.

7. The direct current combiner box according to claim 1, wherein the input end of the direct current combiner box comprises a positive input end and a negative input end, the direct current combiner box further comprises a first voltage to ground control circuit, and the first voltage to ground control circuit is coupled to the negative input end of the direct current combiner box;
the protection circuit is further configured to: when the operating parameter meets the specified condition, send a first voltage control signal to the first voltage to ground control circuit; and
the first voltage to ground control circuit is configured to adjust a voltage to ground at the negative input end of the direct current combiner box to a third voltage based on the first voltage control signal, wherein the third voltage is not higher than a safety voltage.

8. The direct current combiner box according to claim 7, wherein
the protection circuit is further configured to send a second voltage control signal to the first voltage to ground control circuit after a first duration has ended since the first voltage control signal is sent to the first voltage to ground control circuit;
the first voltage to ground control circuit is further configured to adjust the voltage to ground at the negative input end of the direct current combiner box to a fourth voltage based on the second voltage control signal, wherein the fourth voltage is not higher than the safety voltage; and
the protection circuit is further configured to:
determine a second insulation impedance to ground of the direct current combiner box based on the residual current at the output end of the direct current combiner box and the fourth voltage; and
when the second insulation impedance to ground is greater than a fourth threshold, stop sending the protection signal to the boost circuit.

9. The direct current combiner box according to claim 7, wherein:
the first voltage to ground control circuit comprises N resistors and N controllable switches, wherein the N resistors are in a one-to-one correspondence with the N controllable switches, each resistor is coupled to a corresponding controllable switch, each resistor and the corresponding controllable switch form a controllable resistor, a first end of each controllable resistor is coupled to the negative input end of the direct current combiner box, and a second end of each controllable resistor is coupled to ground; and
the first voltage to ground control circuit is configured to:
close a target controllable switch in the N controllable switches based on the first voltage control signal, and adjust the voltage to ground at the negative input end of the direct current combiner box to the third voltage.

10. The direct current combiner box according to claim 1, wherein:
the input end of the direct current combiner box comprises a positive input end and a negative input end, the photovoltaic power generation system further comprises an inverter, an output end of the inverter comprises at least one alternating current phase line, and the output end of the direct current combiner box is coupled to the inverter; and
the direct current combiner box further comprises a second voltage to ground control circuit, wherein the second voltage to ground control circuit is coupled to the at least one alternating current phase line of the inverter;
the protection circuit is further configured to: when the operating parameter meets the specified condition, send a third voltage control signal to the second voltage to ground control circuit; and
the second voltage to ground control circuit is configured to adjust a voltage to ground of the at least one alternating current phase line to a fifth voltage based on the third voltage control signal, wherein a voltage to ground at the negative input end of the direct current combiner box is adjusted to a sixth voltage, and wherein the sixth voltage is not higher than the safety voltage.

11. The direct current combiner box according to claim 10, wherein the protection circuit is further configured to send a fourth voltage control signal to the second voltage to ground control circuit after a second duration has ended since the third voltage control signal is sent to the second voltage to ground control circuit;
the second voltage to ground control circuit is configured to adjust the voltage to ground of the at least one alternating current phase line of the inverter to a seventh voltage based on the fourth voltage control signal, wherein the voltage to ground at the negative input end of the direct current combiner box is adjusted to an eighth voltage, and wherein the eighth voltage is not higher than the safety voltage; and
the protection circuit is further configured to:
determine a third insulation impedance to ground of the direct current combiner box based on the residual current at the output end of the direct current combiner box and the eighth voltage; and when the third insulation impedance to ground is greater than a fifth threshold, stop sending the protection signal to the boost circuit.

12. The direct current combiner box according to claim 1, wherein the direct current combiner box further comprises a breaking circuit, and the breaking circuit is coupled between an input end of the boost circuit and the input end of the direct current combiner box;

the protection circuit is further configured to: after third duration has ended since the protection signal is sent to the boost circuit, determine whether the operating parameter meets the specified condition; and send a breaking signal to the breaking circuit when determining that the operating parameter meets the specified condition, wherein the breaking signal is used to enable the breaking circuit to break a connection between the input end of the boost circuit and the input end of the direct current combiner box; and the breaking circuit is configured to break the connection between the input end of the boost circuit and the input end of the direct current combiner box after receiving the breaking signal.

13. The direct current combiner box according to claim 7, wherein the direct current combiner box further comprises a breaking circuit, and the breaking circuit is coupled between an input end of the boost circuit and the input end of the direct current combiner box;

the protection circuit is further configured to: after fourth duration has ended since the first voltage control signal is sent to the first voltage to ground control circuit, determine whether the operating parameter meets the specified condition; and send a breaking signal to the breaking circuit when determining that the operating parameter meets the specified condition, wherein the breaking signal is used to enable the breaking circuit to break a connection between the input end of the boost circuit and the input end of the direct current combiner box; and the breaking circuit is configured to break, based on the breaking signal, the connection between the input end of the boost circuit and the input end of the direct current combiner box.

14. A photovoltaic power generation system, comprising:
M photovoltaic arrays, configured in a one-to-one correspondence with M boost circuits, wherein each photovoltaic array is coupled to a corresponding boost circuit, and M is a positive integer; and
a direct current combiner box, comprising: a fault detection unit, M boost circuits, and a protection circuit, wherein:
input ends of the direct current combiner box are coupled to the M photovoltaic arrays in the photovoltaic power generation system;
the fault detection unit is configured to detect an operating parameter of the direct current combiner box, wherein the operating parameter comprises at least one of a residual current at an output end of the direct current combiner box, a first insulation impedance to ground of the direct current combiner box, or an input voltage transmitted by the photovoltaic array to the input end of the direct current combiner box;
the protection circuit is configured to: when the operating parameter meets a specified condition, send a first protection signal to a first boost circuit in the M boost circuits, and send a second protection signal to a second boost circuit in the M boost circuits, wherein:
the first protection signal is used to enable the first boost circuit to adjust a first voltage of a photovoltaic array at the input end of the direct current combiner box to a second voltage;
the second protection signal is used to enable the second boost circuit to adjust a first voltage of a photovoltaic array at the input end of the direct current combiner box to a predetermined voltage, wherein the predetermined voltage is a zero voltage or a non-zero voltage not higher than a safety voltage, the predetermined voltage is lower than the second voltage, and the second voltage is not higher than the safety voltage; and
the specified condition comprises at least one of the following: the residual current is greater than a first threshold, the first insulation impedance to ground is less than a second threshold, or the input voltage is greater than a third threshold;
the first boost circuit is configured to: after receiving the first protection signal, adjust the first voltage of the photovoltaic array at the input end of the direct current combiner box to the second voltage; and
the second boost circuit is configured to: after receiving the second protection signal, adjust the first voltage of the photovoltaic array at the input end of the direct current combiner box to the predetermined voltage.

15. The photovoltaic power generation system according to claim 14, wherein the operating parameter comprises the residual current at the output end of the direct current combiner box; the fault detection unit comprises a residual current detection circuit; and the residual current detection circuit is configured to detect the residual current at the output end of the direct current combiner box.

16. The photovoltaic power generation system according to claim 14, wherein the operating parameter comprises the first insulation impedance to ground of the direct current combiner box; the fault detection unit comprises an insulation impedance detection circuit; and the insulation impedance detection circuit is configured to detect the first insulation impedance to ground of the direct current combiner box.

17. The photovoltaic power generation system according to claim 14, wherein the operating parameter comprises the input voltage transmitted by the photovoltaic array to the input end of the direct current combiner box, and the fault detection unit comprises an input voltage detection circuit; and the input voltage detection circuit is configured to detect the input voltage transmitted by the photovoltaic array to the input end of the direct current combiner box.

18. A fault detection method, applied to a photovoltaic power generation system, wherein the photovoltaic power generation system comprises a photovoltaic array, a direct current combiner box, a controller, and an inverter apparatus, wherein an input end of the direct current combiner box is coupled to the photovoltaic array in the photovoltaic power generation system, an output end of the direct current combiner box is coupled to the inverter apparatus, wherein the input end of the direct current combiner box comprises a positive input end and a negative input end, the direct current combiner box further comprises a protection circuit and a first voltage to ground control circuit, and the first voltage to ground control circuit is coupled to the negative input end of the direct current combiner box, and wherein the fault detection method comprises:
  adjusting, by the controller when an operating parameter meets a specified condition, a first voltage of the photovoltaic array at the input end of the direct current combiner box to a second voltage, wherein:
    the second voltage is a zero voltage or a non-zero voltage not higher than a safety voltage;
    the operating parameter comprises at least one of a residual current at an output end of the direct current combiner box, a first insulation impedance to ground of the direct current combiner box, or an input voltage transmitted by the photovoltaic array to the input end of the direct current combiner box; and
    the specified condition comprises at least one of the following: the residual current is greater than a first threshold, the first insulation impedance to ground is less than a second threshold, or the input voltage is greater than a third threshold;
  when the operating parameter meets the specified condition, sending, by the protection circuit, a first voltage control signal to the first voltage to ground control circuit; and
  adjusting, by the first voltage to ground control circuit, a voltage to ground at the negative input end of the direct current combiner box to a third voltage based on the first voltage control signal, wherein the third voltage is not higher than a safety voltage.

19. The fault detection method according to claim 18, comprising:
  sending, by the protection circuit, a second voltage control signal to the first voltage to ground control circuit after a first duration has ended since the first voltage control signal is sent to the first voltage to ground control circuit;
  adjusting, by the first voltage to ground control circuit, the voltage to ground at the negative input end of the direct current combiner box to a fourth voltage based on the second voltage control signal, wherein the fourth voltage is not higher than the safety voltage;
  determining, by the protection circuit, a second insulation impedance to ground of the direct current combiner box based on the residual current at the output end of the direct current combiner box and the fourth voltage; and
  when the second insulation impedance to ground is greater than a fourth threshold, stopping, by the protection circuit, sending a protection signal to a boost circuit.

* * * * *